(12) United States Patent
Takehara et al.

(10) Patent No.: US 7,385,624 B2
(45) Date of Patent: Jun. 10, 2008

(54) REMOTE IMAGE DISPLAY METHOD, IMAGE CAPTURING DEVICE, AND METHOD AND PROGRAM THEREFOR

(75) Inventors: Nobuhiko Takehara, Yokohama (JP); Tomoki Watanabe, Yokohama (JP); Hiroki Anzai, Yokohama (JP); Katsumi Kishida, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 458 days.

(21) Appl. No.: 10/510,954

(22) PCT Filed: Jan. 15, 2004

(86) PCT No.: PCT/JP2004/000223
§ 371 (c)(1),
(2), (4) Date: Oct. 29, 2004

(87) PCT Pub. No.: WO2004/066632

PCT Pub. Date: Aug. 5, 2004

(65) Prior Publication Data
US 2005/0212909 A1 Sep. 29, 2005

(30) Foreign Application Priority Data
Jan. 17, 2003 (JP) .................. 2003-009277
Jan. 17, 2003 (JP) .................. 2003-009278

(51) Int. Cl.
*H04N 7/00* (2006.01)
*H04N 7/18* (2006.01)
*H04N 5/232* (2006.01)
*H04N 11/00* (2006.01)

(52) U.S. Cl. .............. 348/36; 348/155; 348/211.3; 348/211.11; 348/552

(58) Field of Classification Search .............. 348/36, 348/39, 155, 211.3, 211.11, 218.1, 222.1, 348/552
See application file for complete search history.

(56) References Cited

U.S. PATENT DOCUMENTS
4,786,966 A * 11/1988 Hanson et al. .............. 348/158
(Continued)

FOREIGN PATENT DOCUMENTS
CN 1278384 A 12/2000
(Continued)

OTHER PUBLICATIONS
Yamazawa, Kazumasa, "Principle and characteristics and omnidirectional camera with a mirror", Computer Vision and Image Media, vol. 125, No. 21, pp. 155-160, (with English abstract).
(Continued)

*Primary Examiner*—Ngoc-Yen Vu
*Assistant Examiner*—James A Meyers
(74) *Attorney, Agent, or Firm*—Oblon, Spivak, McClelland, Maier & Neustadt, P.C.

(57) ABSTRACT

An omnidirectional camera performs image sensing of a panoramic object 6 surrounding it, and sends the video signal to an image capturing device 1, then the image capturing device 1 extracts a video signal of a partial object 61 and sends the extracted video signal to a camera-equipped portable terminal 3 carried in user's hand at a place distant from the omnidirectional camera 2 to display the image of the video signal on a display surface 32a of the portable terminal, and the user shoots a surrounding object 8 with the portable terminal 3 and sends the surrounding video signal to the device 1. When the shooting direction of the portable terminal 3 is turned as indicated by the broken line, the device 1 detects a change in the shooting direction of he portable terminal 3 from a difference between the surrounding video signals generated before and after the turning of the portable terminal, and extracts, from a panorama video signal, a video signal of a partial object 62 turned from the partial object 61 in correspondence to the difference and sends the extracted video signal to the portable terminal 3 to display the image of the video signal.

21 Claims, 20 Drawing Sheets

U.S. PATENT DOCUMENTS

| | | |
|---|---|---|
| 6,411,275 B1 | 6/2002 | Hedberg |
| 2001/0019355 A1 | 9/2001 | Koyanagi et al. |
| 2002/0175896 A1 | 11/2002 | Vaananen et al. |

FOREIGN PATENT DOCUMENTS

| | | |
|---|---|---|
| DE | 94 00 003 U1 | 5/1995 |
| EP | 1 130 906 A2 | 9/2001 |
| JP | 06-078341 | 3/1994 |
| JP | 11-205775 | 7/1999 |
| JP | 2000-101992 | 4/2000 |
| JP | 2002-077882 | 3/2002 |
| JP | 2002-185952 | 6/2002 |
| WO | WO 99/12349 | 3/1999 |

OTHER PUBLICATIONS

Taniguchi, Yukinobu et al. "PanoramaExcerpts: Video Cataloging by Automatic Synthesis and Layout of Panoramic Images", IECEJ Journal D-II, vol. J82-D-II, No. 3, p. 390-398.

Yamamori, Kazuhiko, "Future Network Technology Series, Media Processing Techniques 4", vol. 20, Denki-Tsuushin Kyoukai, 1st edition, pp. 208-211, 1999.

* cited by examiner

| IDENTIFICATION INFORMATION | ID1 | ID2 | ID3 | ID4 | ID5 | ID6 | ID7 | ID8 |
|---|---|---|---|---|---|---|---|---|
| x5 | x6 | x7 | x8 | 0 | x1 | x2 | x3 | x4 |
| AZIMUTH | WEST | NORTH-WEST | NORTH | NORTH-EAST | EAST | SOUTH-EAST | SOUTH | SOUTH-WEST |
| ANGLE OF ELEVATION/DEPRESSION | Δy1 | Δy2 | Δy3 | Δy4 | Δy5 | Δy6 | Δy7 | Δy8 |

FIG. 16

REMOTE IMAGE DISPLAY METHOD, IMAGE CAPTURING DEVICE, AND METHOD AND PROGRAM THEREFOR

TECHNICAL FIELD

The present invention relates to a remote image display method for image sensing of a panoramic object by an image sensor, that is, by a camera (hereinafter referred to simply as camera) that outputs video signals, and for displaying the captured images to a user at a place remote from the camera; the invention also pertains to an image capturing device and method therefor, and an image capturing program.

BACKGROUND ART

For the purpose of observing the traffic on the road, it is now a general practice to set a panhead camera to monitor the traffic conditions; video signals obtained by shooting with the camera are sent over a communication line to a monitor set placed at a remote location, where the received video signal are played back to display the traffic conditions on a display. The watcher manipulates, while watching the display, an operating button or lever of a remote controller to send a control signal for changing the shooting direction (horizontal and vertical directions) of the monitor camera, or/and a control signal for changing the zoom amount of a zoom lens of the camera over the communication line to a control mechanism of the monitor camera to control it for changing its shooting direction and shooting condition (refer to, for example, Japanese Patent Application Koukai publication No. 205775/99 (published on Jul. 30, 1999).

There is offered a service what is called video live through a panhead camera set on the roof of a high-rise building; a user accesses the camera from his personal computer via the Internet or similar communication network to occupy the camera for a predetermined time, receives shooting video signals of the camera by the personal computer to play back the video signals to provide a display their images on the display, and while watching the image on the display, the user operates the personal computer to remotely control the camera shooting direction or the zoom amount of the lens to enjoy seeing respective parts of a wide-range panoramic object.

It is possible for a parent to control a personal computer at his home or office to access a camera set up in kindergarten to play back video signal from the camera for display on the personal computer and to remotely control the shooting direction or zoom amount of the camera to observe his child's movements under various circumstances.

Further, when video signals from a security camera set up in a convenience store are played back to display the images on a display at a remote place, it is possible for a watchman to remotely control the shooting direction or zoom amount of the security camera while watching the images being displayed.

Such remote control of a camera to display video signals therefrom can be used for various purposes. In the prior art, the shooting direction of the camera itself is changed by mechanical control, or the control for mechanically moving the zoom lens is effected by a button (key) operation or level operation using a personal computer. Moreover, while one user remotely controls the camera, other users cannot controls the camera; that is, the camera is occupied by one user for a predetermined time, for instance.

Since the control for obtaining a desired image by a conventional remote image display scheme is remote control of the camera itself by operating a button (key) or lever, the operability of the camera is poorer than in the case of manually operating the camera in one's hand or on the panhead to obtain a desired image, that is, the image thus obtained becomes a little different from the desired one in some cases.

An object of the present invention is to provide a remote image display method that permits displaying a desired remote image in the same way a user directly operates the camera by his hand, and an image capturing device and method therefor, and an image capturing program.

DISCLOSURE OF THE INVENTION

According to the remote image display method of the present invention: a remote image sensing device performs image sensing of a panoramic object, and sends a video signal of a part of image-sensed panoramic object via an image capturing device to image display means at a place different from the remote image sensing device; the image display means lays back and display the received video signal as an image of a part of said panoramic object; a camera-equipped portable terminal at a position where the display on said image display means can be seen performs image sensing of its surroundings, and the surrounding video signal to said image capturing device; the image capturing device obtains variation information about the surrounding image from the camera-equipped portable terminal based on a previous received surrounding video signal and the current received surrounding video signal, then obtains from the remote image sensing device a video signal of a part of the panoramic object changed corresponding to a change of the surrounding image based on the variation information, and sends the obtained image signal to the image display means.

The panoramic object is sufficiently wide to such an extent as not to be suitable for displaying as an image of one display frame of the image display means, or it can be displayed as the image of one display frame to some extent but it is equal to the range of a visual angle over which each part of the display needs to be seen in detail, and the field angle is 360 degree or less, and the images to be displayed need not always be continuous. There are two schemes for the image capturing device to obtain the video signal of a changed part of the panoramic object from the remote image sensing device. According to the one scheme: variation information on the image of the current surrounding video signal (hereinafter referred to as the current image) with respect to the image of the previous surrounding video signal (hereinafter referred to as the previous image) received from the camera-equipped portable terminal is detected by variation detecting means from the received surrounding video signal; a capturing signal for obtaining a video signal of a part of the panoramic object is generated by capturing signal generating means based on the detected variation information; the generated capturing signal is sent to the remote image sensing device; and the video signal received by the remote image sensing device is sent by image relay means to the image display means. With this scheme, the image capturing device sends the capturing signal to the remote image sensing device and receives the video signal of the changed part of the panoramic object from the remote image sensing device to thereby obtain an image of the video signal of the changed part of the panoramic object.

According to the other scheme, the user operates the camera-equipped portable terminal in his hand to shoot a part of the panoramic object while watching the image of a part of the panoramic object displayed on the image display means, by which it is possible to remotely shoot and display a desired part of the panoramic object; in this case, the camera can be operated in the same way the user himself operates the camera at the place where he can see the panoramic object directly. Hence, operability of the camera is excellent and no deviation is hard to occur between the desired part of the panoramic object and the displayed image.

BRIEF DESCRIPTION OF THE DRAWINGS

FIG. 16 is a diagram showing another example of the stored contents of the camera direction storage means 19.

BEST MODE FOR CARRYING OUT THE INVENTION

Description of Principles of the Invention

The principles of the present invention will be described with reference to FIG. 1.

Figure 2:
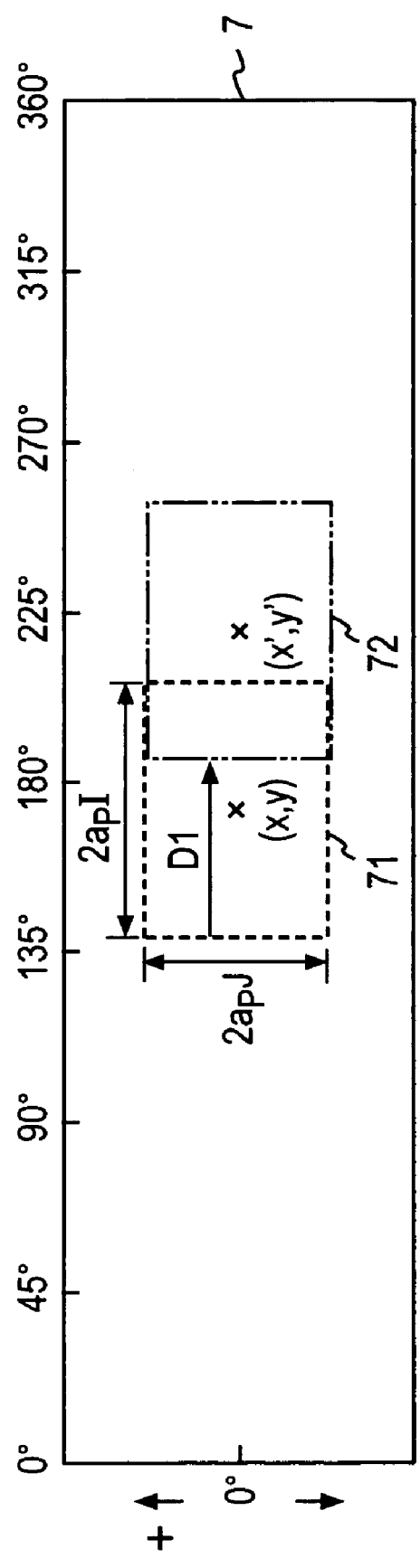
FIG. 2 is a diagram for explaining an image sensor device of an omnidirectional video camera and the extraction of an image signal of an each partial object.

This example uses an omnidirectional camera as a remote image sensing device 2. The omnidirectional camera is a digital video camera, which is an omnidirectional image sensor capable of image sensing of objects 360-degree surroundings; refer to, for example, Kazumasa Yamazaki, "Principle and Characteristics of Omnidirectional camera with a mirror," Computer Vision and Image Media, 125-21, P. 155-460, Jan. 19, 2001. The omnidirectional camera is commercially available; by which images of a 360-degree panoramic object, with a predetermined reference direction at zero degree as shown in FIG. 2, for instance, are formed on a rectangular two-dimensional image sensor device 7, such as CCD (Charge Coupled Device), from which photoelectric conversion signals corresponding to respective pixels can be extracted.

Figure 1:
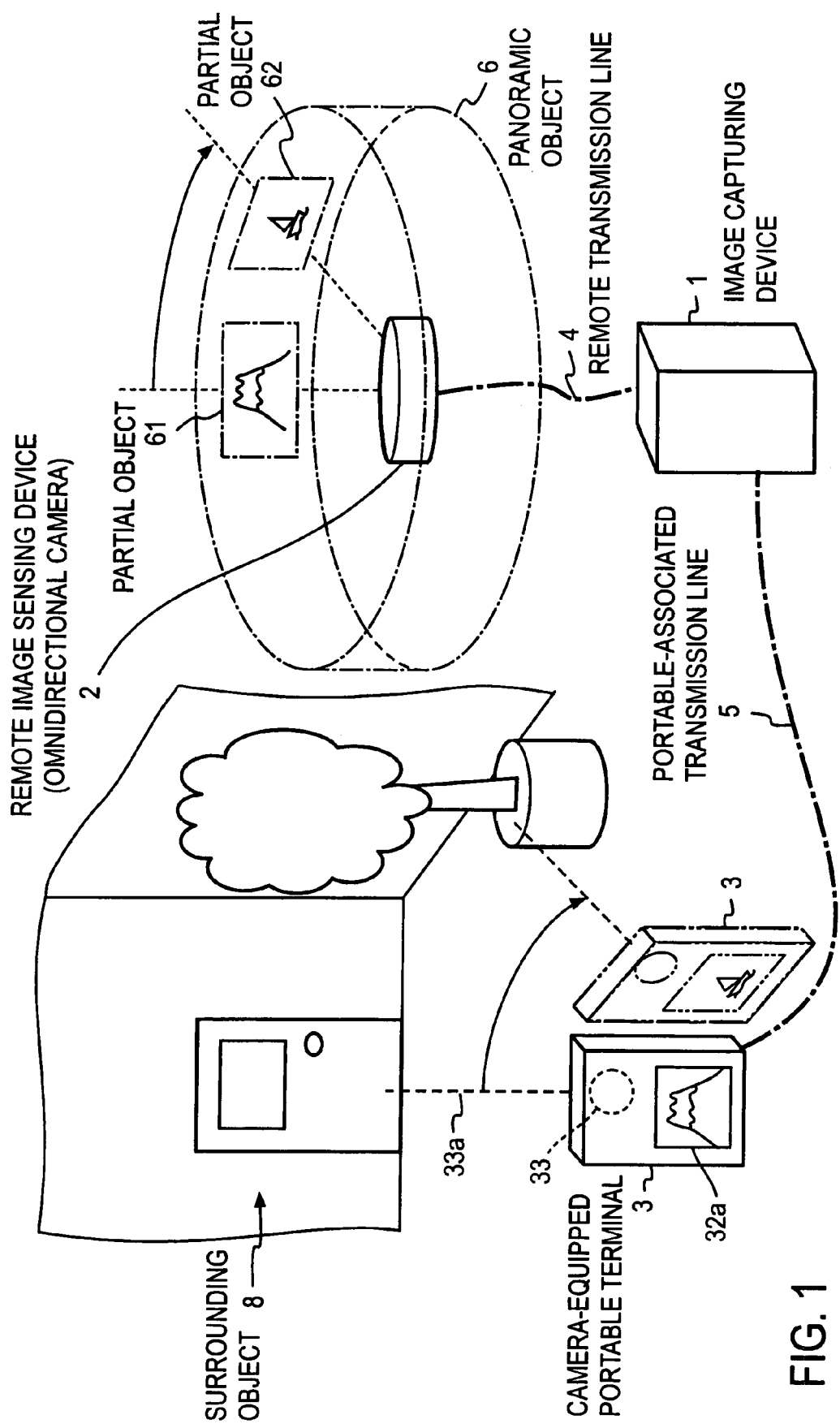
FIG. 1 is a diagram illustrating an example of the system configuration for explaining the principles of the present invention.

In FIG. 1 the remote image sensing device 2 is capable of image sensing of a 360-degree surrounding panoramic object 6. In this example a captured video signal of a part of the panoramic object by the remote image sensing device 2, for example, a part (hereinafter referred to as a partial object) 61 in a direction 180 degrees away from the reference, that is, each pixel signal of an area 71 in the image sensor device 7 in FIG. 2 is extracted and sent over a transmission line 4 to the image capturing device 1.

The image capturing device 1 sends the received captured video signal of the partial object over a transmission line 5 to a camera-equipped portable terminal 3 that is located at a place different from the remote image sensing device 2 and serves also as image display means. This example uses a camera-equipped portable telephone as the camera-equipped portable terminal 3, but it may be a camera-equipped PDA (Personal Digital Assistance) or camera-fixed PDA terminal as long as it is equipped with a digital video camera and communicating means and can be manually operated to take pictures. To distinguish between the transmission lines 4 and 5, they will hereinafter be referred to as a remote transmission line 4 and a portable-associated transmission line 5, respectively. Both of the transmission lines 4 and 5 may be dedicated transmission lines or transmission lines that pass through one or more communication networks, such as the Internet, or wireless/wire public telecommunication network.

Incidentally, in this example, the camera-equipped portable terminal 3 is also provided with image display means, and the captured video signal of the partial object 61, sent from the remote image sensing device 2 and received from the image capturing device 1, is played back by the image display means and displayed on its display surface 32a.

A user holds the camera-equipped portable terminal 3 in his hand and takes pictures of a surrounding object 8 by a camera (portable image sensing means) 33 of the terminal 3; as he sees the partial object 61 in the panoramic object 6 displayed on the display surface 32a, if he wants to see another partial object in the panoramic object 6 that he wishes to display at a remote place, then the user operates the camera-equipped portable terminal 3 to direct its camera 33 to take pictures of the partial object desired to see. For example, in the case of taking pictures of a partial object 62 in a direction 45 degree away to the right from the partial object 62, the direction 33a of the camera 33 of the camera-equipped portable terminal 3 is turned 45 degrees to the right as indicated by the one-dot chain line in FIG. 1.

The video signal of the surrounding object being image sensed by the camera 33 of the camera-equipped portable terminal 3 (which video signal will hereinafter be referred to as a surrounding video signal) is sent over the portable-associated transmission line 5 to the image capturing device 1. The image capturing device 1 detects a change in the surrounding image being shot by the camera-equipped portable terminal 3 from the previous and current surrounding video signals.

Figure 3A:
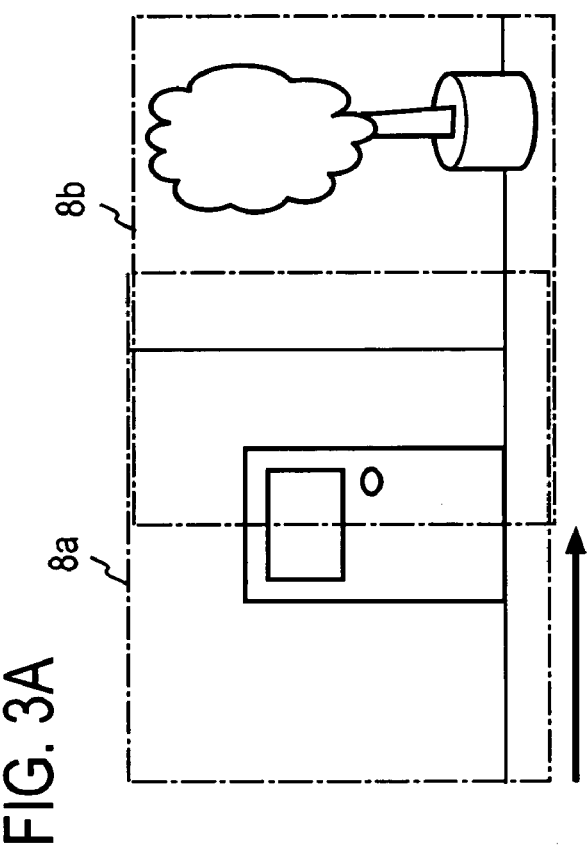
FIG. 3A is a diagram showing, by way of example, how captured images move on the image sensor when a camera-equipped portable terminal is turned in the direction of taking pictures.
Figure 3B:
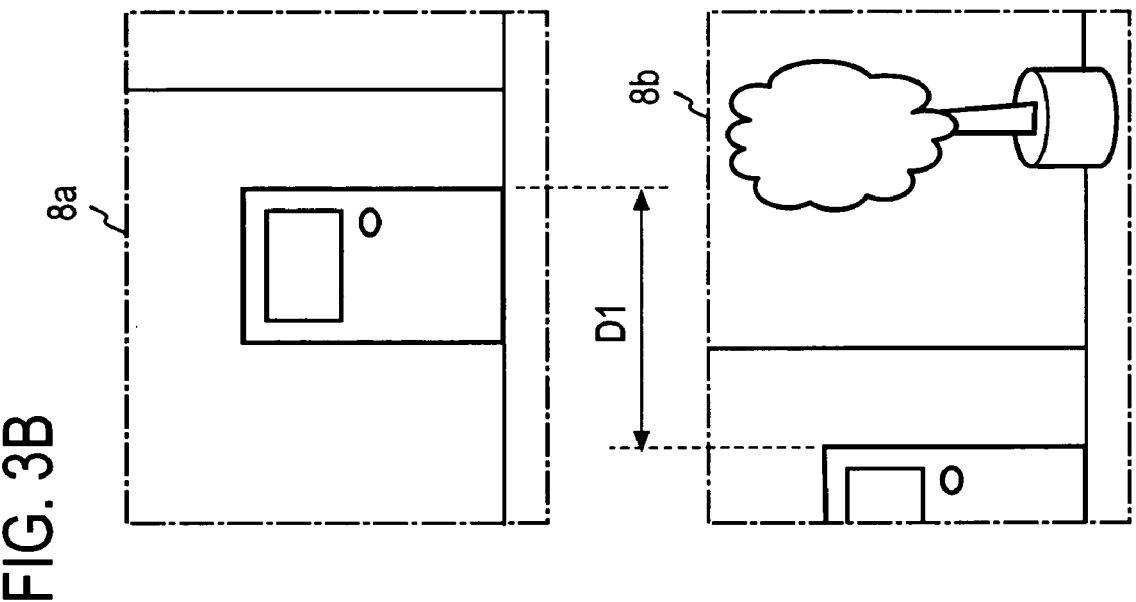
FIG. 3B is a diagram showing images before and after they move in FIG. 3A.

The range over which the camera-equipped portable terminal 3 is shooting the surrounding object 8 is a shooting range 8*b* shifted to right from that 8*a* as shown in FIG. 3A. Accordingly, the received surrounding video signal at the time of seeing the reproduced image of the partial object 61 is the video signal of the shooting range 8*a* shown at the upper side of FIG. 3B, but the received surrounding video signal with the shooting direction of the camera-equipped portable terminal 3 turned 45 degrees to right is the video signal of the shooting range 8*b* shown at the lower side of FIG. 3B. Comparison of the both received surrounding video signals indicates that the same image part shifts from right to left in the drawing, from which it is possible to detect that the shooting direction of the camera-equipped portable terminal 3 has been turned to right.

The image capturing device 1 detects variation information about the received surrounding video signal with respect to the previous one, then based on the variation information, changes the video signal to be extracted from the video signal being shot by the remote image sensing device, and instructs the remote image sensing device 2 so that the partial object in the panoramic object 6 corresponding to the extracted video signal changes corresponding to the change in the image of the received surrounding video signal. In the case where the shooting direction of the camera-equipped portable terminal 3 is turned 45 degrees to right in the above example, the image capturing device 2 instructs the remote image sensing device 2 via the remote transmission line 4 to extract the video signal corresponding to the partial object 62 to which the partial object 61 of the panoramic object 6 has turned 45 degrees to right and to extract the video signal of the area 72 to which the area 71 on the image sensor device 7 in FIG. 2 has turned 45 degrees to right.

Upon receiving the instruction, the remote image sensing device 2 extracts the video signal from the area 72 of the image sensor 7, and sends the extracted video signal to the image capturing device 1 via the remote transmission line 4, and the image capturing device 1 sends the received video signal to the camera-equipped portable terminal 3 via the portable-associated transmission line 5. The camera-equipped portable terminal 3 displays on its display surface 32*a* the reproduced image corresponding to the partial object 62.

The remote image sensing device 2 always shoots the panoramic object 6 and responds to the capturing instruction from the image capturing device 1 to send at all times the video signal of the partial object via the image capturing signal to the camera-equipped portable terminal 3 at the rate of 30 frames per second, for instance. The camera-equipped portable terminal 3 also sends its surrounding video signal to the image capturing device 1 at all times.

As will be seen from the above, according to the method of the present invention, remote shooting and displaying of a desired partial object can be achieved by operating the camera-equipped portable terminal 3 to shoot the part of the panoramic object 6 desired to display while directly watching the panoramic object—this provides enhanced operability of the camera and makes it unlikely to incur the deviation between the desired partial object and the reproduced image of its video signal. For example, in the case of remotely controlling the camera by operating keys of a portable terminal such as a portable telephone, the operability is poor because of the key operation, and since the keys are small and closely packed, an erroneous operation is likely to occur, but the method of the present invention is free from such a possibility.

Embodiment 1

Figure 4:
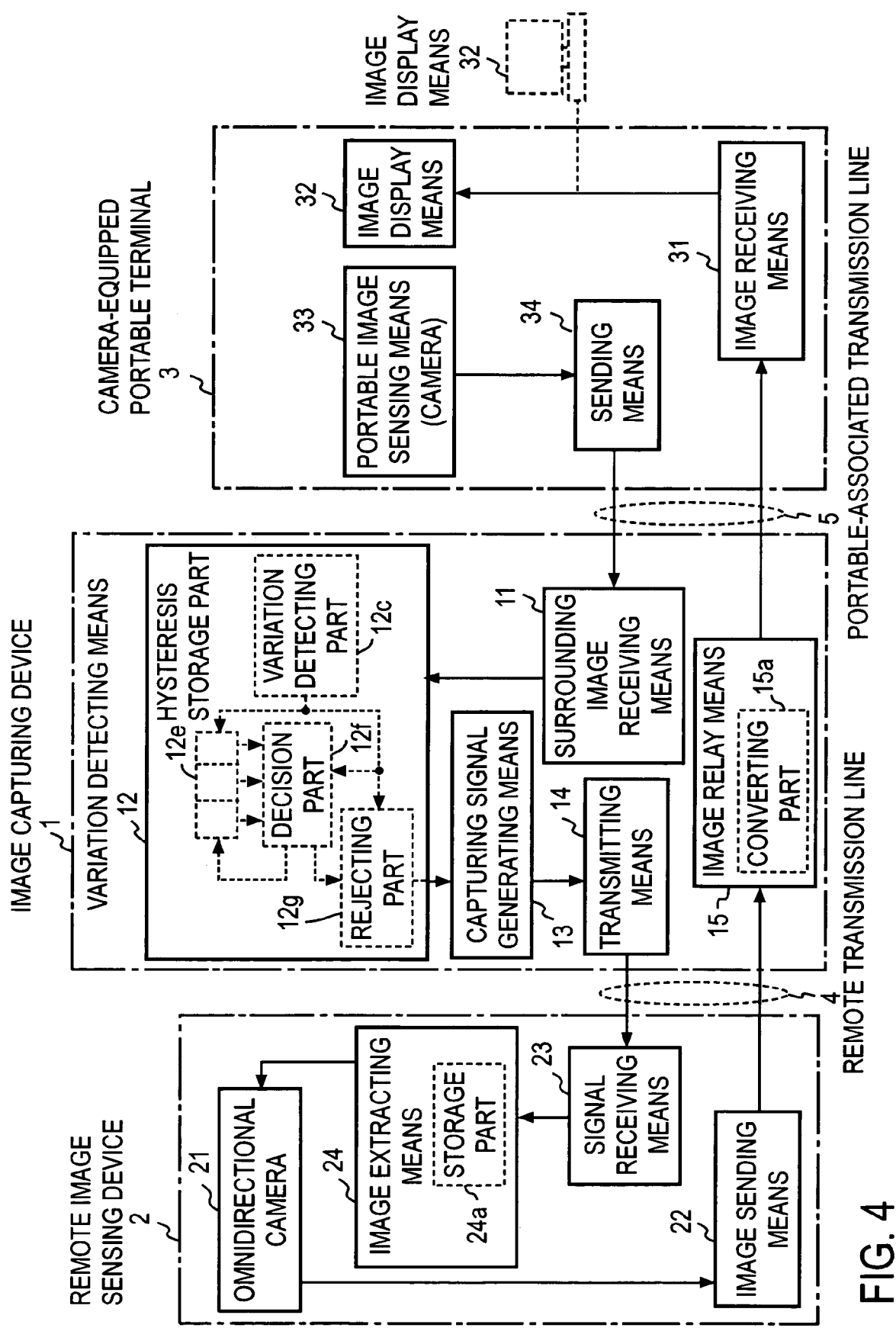
FIG. 4 is a block diagram illustrating an example of the system configuration of Embodiment 1.

FIG. 4 illustrates in block form an example of the system configuration of Embodiment 1 of the present invention. In this application the same reference numerals denote parts of the same function and no duplicate description will be given of them.

The image capturing device 1 is provided with: surrounding image receiving means 11 that receives a surrounding video signal sent from the camera-equipped portable terminal 3 over the portable-associated transmission line 5; variation detecting means 12 that detects a variation in the image of the received surrounding video signal as variation information; capturing signal generating means 13 that generates a capturing signal based on the detected variation information; sending means 14 which sends the generated capturing signal to the remote image sensing device 2 over the remote transmission line 4; and image relay means 15 that receives the captured video signal sent from the remote image sensing device 2 over the remote transmission line 4 and passes it to the camera-equipped portable terminal 3 over the portable-associated transmission line 5.

The remote image sensing device 2 is provided with: an omnidirectional camera 21 as remote image sensing device means for image sensing of a panoramic object; signal receiving means 23 that receives the capturing signal sent from the image capturing device 1 over the remote transmission line 4; image extracting means 24 that extracts the captured video signal of a partial object from the omnidirectional camera 21; and image sending means 22 that sends the captured video signal to the image capturing device 1 over the remote transmission line 4.

The camera-equipped portable terminal 3 is provided with: image receiving means 31 that receives the captured video signal sent from the remote image sensing device 2 over the portable-associated transmission line 5; image display means 32 that plays back and displays the received captured video signal; a digital video camera 33 that is portable image sensing means for image sensing of surrounding objects; and sending means 34 that sends the surrounding video signal fed thereto from the camera 33 to the image capturing device 1 over the portable-associated transmission line 5.

The image extracting means 24 of the remote image sensing device 2 extracts from the omnidirectional camera 21 a captured video signal of one frame that is determined by the received capturing signal. For example, based on the capturing signal, the image capturing means extracts a sequence of signals corresponding to pixels $(x+a_p i, y+a_p i)$ (where $i=0, \pm 1, \ldots, \pm I$, $J=0, \pm 1, \ldots, \pm J$, $2I$ being the number of x-direction pixels corresponding to one frame and $2J$ the number of y-direction pixels corresponding to one frame) about a pixel position $(x_1, y_1)$ in the image sensor device shown in FIG. 2, and the thus extracted signal is output as a captured video signal of the area 71. That is, in this example the center position of the partial object desired to extract and the zoom amount are specified by the capturing signal. In this example the capturing signal is composed of reference pixel position signals x, y and a zoom in/out signal $a_p$.

The captured video signal is sent via the image capturing device to the camera-equipped portable terminal 3, and the image of the partial object in the panoramic object being image sensed by the remote image sensing device 2, in this example, the image of the partial object 62 in FIG. 1, is displayed on the image display means 32 of the camera-equipped portable terminal 3.

Figure 5:
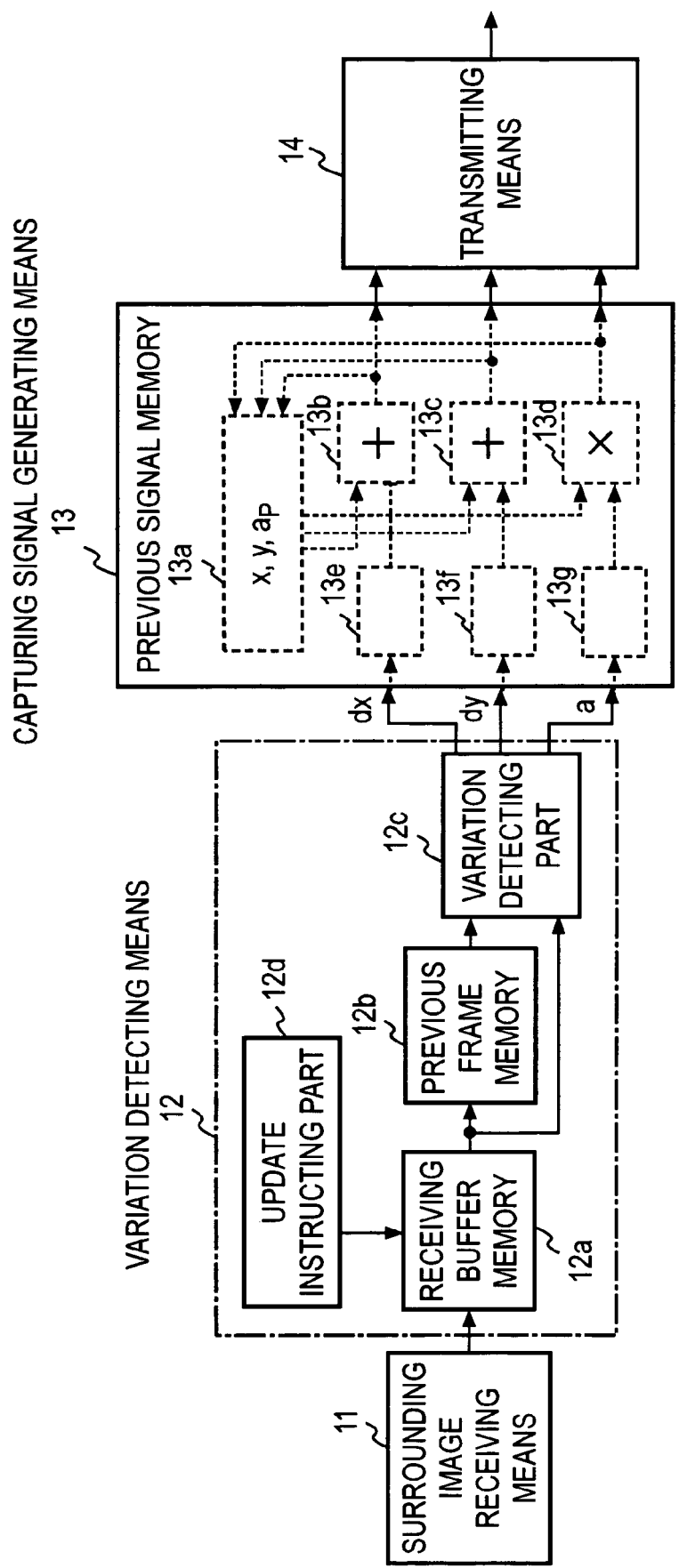
FIG. 5 is a diagram depicting an example of the functional configuration of each of variation detecting means 12 and capturing signal generating means 13 in FIG. 4.

The variation detecting means 12 of the image capturing device 1 detects, from the received surrounding video signal, information about a variation between the image of the current video signal (which image will hereinafter be referred to as the current image) and the image of the previous video signal received from the camera-equipped portable terminal 3. For example, as depicted in FIG. 5, the received surrounding video signal is stored in a receiving buffer memory 12a, before which the surrounding video signal previously received and stored in the receiving buffer memory 12a is stored in a previous frame memory 12b. The surrounding video signals stored in the memories 12a and 12b are both input to a variation detecting part 12c. The variation detecting part 12c detects the direction of movement from the previous image to the current one or the degree of movement (distance) or/and a change in the size of the object of the current image with respect to the previous image, i.e., the zoom amount, are detected. The variation information can be detected, for example, by techniques for analyzing the camera operation during shooting, that is, what is called camera work. The camera work analysis technique is disclosed, for example, in Yukinobu TANIGUCHI, et at., "PanoramExcerpts: Video Cataloging by Automatic Synthesis and Layout of Panoramic Images," IECEJ Journal D-II, Vol. J82-D-II No. 3, PP. 390-398, March 1999 and a book supervised by Kenji KOGURE, written by Kazuhiko YAMAMORI, "Future Network Technology Series, Media Processing Techniques 4," Denki-Tsuushin Kyoukai, First Edition, Nov, 10, 1999.

A description will be given of an example of the scheme for analyzing camera works of side-to-side operation (pan), up-and-down operation (tilt) and operation of changing the angle of view by the camera lens (zoom). Let the previous image f(x, y) and the current image by f'(x', y'), where $$(x', y') = (ax + d_x, ay + d_y)$$

that is, let a, $d_x$ and $d_y$ represent parameters for explaining zoom, pan and tilt, respectively. The parameters a, $d_x$ and $d_y$ are calculated which minimize the following square error between the images f(x, y) and f'(x', y'):

$$(1/N)\Sigma_{x,y}\{f(x,y)-f'(x',y')\}^2.$$

These parameters a, $d_x$ and $d_y$ are used as the variation information. In other words, the variation detecting part 12c calculates, for example, a, $d_x$ and $d_y$ to obtain the variation information; that is, a is zoom in/out information, and dx and $d_y$ direction information. In the case of detecting only the side-to-side turning of the camera-equipped portable terminal 3, the parameters need only to be set at a=1 and $d_y$=0; in the case of detecting only the up-and-down turning action, a=1 and $d_x$=0; in the case of detecting only a change in the zoom, $d_x$=$d_y$=0; and in the case of detecting only the turning action, a=1.

The capturing signal generating means 13 generates, from the variation information detected by the variation detecting means 12 and a previous capturing signal, a capturing signal that is used to obtain the captured video signal of the partial object of the panoramic objection. For example, as shown in FIG. 5, in the capturing signal generating means 13, capturing signals x, y and $a_p$, for instance, generated previously and currently used are stored in a previous signal memory 13a; these signals x, y and $a_p$ and the variation information, for example, $d_x$, $d_y$ and $a_x$, are calculated by x+$d_x$→x in an adding part 13b, y +$d_y$→y in an adding part 13c, and $a_p$×a→$a_p$ in a multiplying part 13d, and they are complemented to generate new capturing signals x, y and $a_p$, which are provided to the previous signal memory 13a to update the capturing signals stored therein, and at the same time, they are output to the sending means 14. While the image capturing device 1 does not perform the image capturing processing, there stored in the previous signal memory 13a, as initial values, predetermined capturing signals, for example, the center, x, y, of the sensor device in FIG. 2 and a half value, $a_p$, of the maximum zoom amount; upon the image capturing device 1 starting the capturing processing, the initial value signals x, y and $a_p$ in the previous signal memory 13a are sent as capturing signals to the remote image sensing device 2.

When the value of the variation information is small, for example, when $d_x$=1, the image of the partial object of the panoramic object displayed on the camera-equipped portable terminal 3 remains substantially unchanged; to cope with this, it is advisable to provide round-off pats 13e, 13f and 13g, by which if $d_x$, $d_y$ and a are smaller than their predetermined values, $d_x$ and $d_y$ are rounded off to 0s and a to 1, which are provide to the adding parts 13b and 13c and the multiplying part 13d. The above-mentioned predetermined values set in the discarding parts 13e, 13f and 13g differ among the discarding parts and according to the mode of use of this remote display system. In the case of displaying a partial object in a distant scene, the predetermined values are chosen relatively large, and in the case of using the system to prevent crime in a relatively space, they are chosen relatively small; as for $d_x$, for instance, it is considered to be rounded down to 0 when it is 5 or smaller at minimum.

In general, updating of the capturing signals to be sent to the remote image sensing device 2 upon each reception of one frame is not preferable since it increases the amount of processing, and even if updating is carried out for each frame, the user hardly perceives a change in the received partial-object image. Accordingly, the capturing signals may be sent to the remote image sensing device 2 at appropriate time intervals. This time interval may be determined properly based on the usage pattern of the system: for example, every 1/10 sec when conditions of the object change relatively rapidly as in the case of traffic monitoring; when the object is scenery, every 1/3 sec, for instance, and in some cases, every several seconds. To this end, an update instructing part 12d is provided, for example, in the variation detecting means 12, and the receiving buffer memory 12a responds to an instruction from the update instructing part 12d to capture the surrounding video signal of one frame at preset update time intervals, and the variation detecting part 12c detects variation information at the update time intervals. Alternatively, the contents of the receiving buffer memory 12a are updated for each frame of surrounding video signals and, upon each detection of variation information, the contents of the receiving buffer memory 12a are transferred to the previous frame memory 12b. When all pieces of variation information detected in the variation information detecting part 12c are zero, that is, when $d_x=d_y=0$ and a =1 in this example, it is not necessary to generate and send the capturing signals to the remote image sensing device, in which the capturing signals need not be generated, either. The capturing signals may selectively be generated and transmitted in correspondence only to those pieces of the variation information which have undergone changes.

In the remote image sensing device 2, the capturing signals received by the signal receiving means 23 are input to the image extracting means 24 as shown in FIG. 4, and the previously received capturing signals stored in a storage part 24a with the newly received capturing signals. Based on the thus updated capturing signals in the storage part 24a, the image extracting means 24 extracts the video signal of the partial object in the panoramic object being shot by the omnidirectional camera 21. For example, the output of the image sensor device 7 of the omnidirectional camera 21 changes, as shown in FIG. 2, from the state where video signals of a one-frame area 71 with the pixel (x, y) at its center (reference) are always extracted based on the yet-to-be capturing signals (reference pixel position signals) to the state where video signals of a one-frame area 72 with the pixel (x', y') at its center are always extracted based on the updated capturing signals. In the example of FIG. 2, the shooting direction of the camera-equipped portable terminal 3 does not change vertically nor does the zoom amount and the shooting direction is turned only to the right, that is, the variation information $d_y=o$ and a=1 and $d_x$ is detected, and the capturing signals become from x, y, $a_p$ to x'←x+$d_x$, y', $a'_p$←$a_p$. The updated pieces of information x, y, $a_p$ are each added with a prime ['] to distinguish between them and the yet-to-be updated pieces of information. In FIG. 4, $d_x=D_1$.

The captured video signal extracted from the omnidirectional camera 2 is sent from the image sending means 22 to the camera-equipped portable terminal 3 via the image capturing device 1. Accordingly, the image to be displayed on the image display means 32 of the camera-equipped portable terminal 3 also changes. That is, the desired partial object in the panoramic object changes in accordance with the camera work (direction and/or zoom operation) of the camera-equipped portable terminal 3, and the captured signal of the changing partial object is reproduced and displayed on the image display means 32.

The zoom amount $a_p$ will be described; at the time of the maximum zoom amount $a_{PM}$, the image extracting means 24 extracts pixel signal of the image sensor device 7 (FIG. 2), 2I in the x-direction and 2J in the y-direction. When the zoom amount is $a_p$, 2I and 2J signals are extracted in the x- and y-directions, respectively at intervals of $a_{PM}/a_p$ pixels. In this way, when the zoom amount $a_p$ is large, the captured video signal of the partial object is extracted from a narrow area in the image sensor device 7, whereas when $a_p$ is small, the captured video signal of the partial object is extracted from a wide area, and the image that is displayed on the image display means 32 of the camera-equipped portable terminal 3 is also zoomed in/out with a change in the zoom amount $a_P$.

The image relay means 15 of the image capturing device 1 sends the captured video signal received from the remote image sensing device 2 to the camera-equipped portable terminal 3 after a converting part 15a (see FIG. 4) introduces changes into the video signal according to the rating of the camera-equipped portable terminal 3 and the specs of the portable-associated transmission line 3, such as conversion of the screen size of the captured video signal to the screen size of the image display means 32 and conversion of amplitude (luminance) resolution or compression coding for each pixel.

Figure 6:
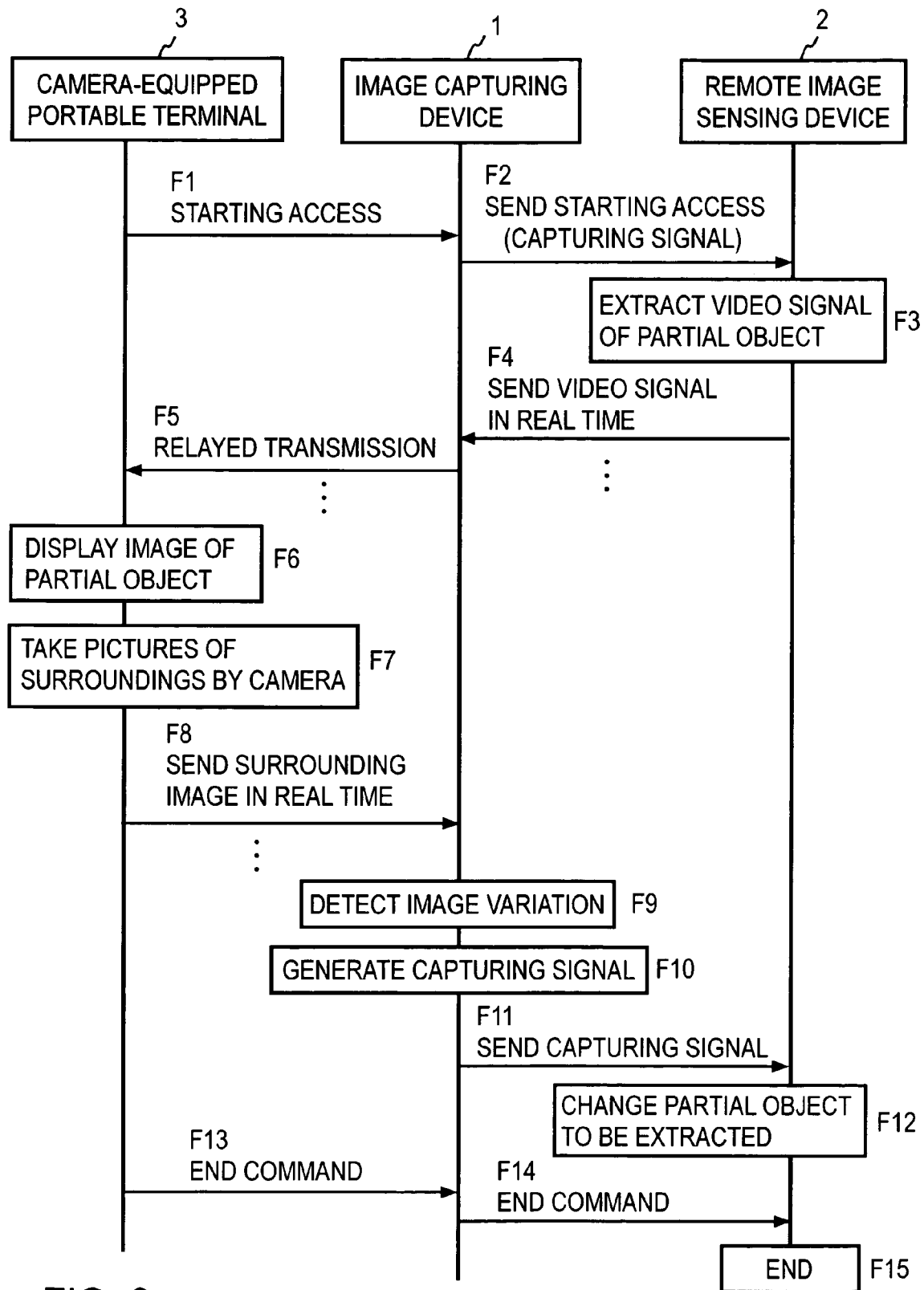
FIG. 6 is a diagram showing an example of the operation procedure of the entire system shown in FIG. 4.

Referring to FIG. 6, the flow of processing in the system shown in FIG. 4 will be described in brief. The camera-equipped portable terminal 3 sends a starting access to the image capturing device 1 (F1). The image capturing device 1 sends the starting access or capturing signal (initial value) to the remote image sensing device 2 (F2). The remote image sensing device 2 extracts the captured video signal of a partial object predetermined or corresponding to the capturing signal (which "captured video signal" will hereinafter be referred to also as "captured signal" in some cases) (F3), and the captured signal is sent to the image capturing device in real time (F4). The image capturing device 1 relays the received captured signal to the camera-equipped portable terminal 3 (F5).

The camera-equipped portable terminal 3 plays back the received captured signal to display the image of the partial object (F6). The image sensing of the surrounding object is performed by the camera-equipped portable terminal 3 (F7). The surrounding video signal by the image sensing operation is sent to the image capturing device 1 in real time (F8).

The image capturing device 1 detects a change in the camera operation of the camera-equipped portable terminal 3 from a change in the image of the received surrounding video signal (F9), and if such a change is detected, generates capturing signal (F10) and sends the capturing signal to the remote image sensing device 2 (F11).

The remote image sensing device 2 changes, based on the received capturing signal, the video signal of the partial object to be extracted (F12). This is followed by the repetition of processing succeeding that F3 of extracting the captured signal according to the capturing signal, and upon sending an end command from the camera-equipped portable terminal 3 to the image capturing device 1 (F13), the image capturing device 1 relays the end command to the remote image sensing device 2 (F14), and the remote image sensing device 2 stops sending of the captured signal of the partial object (F15).

Figure 7:
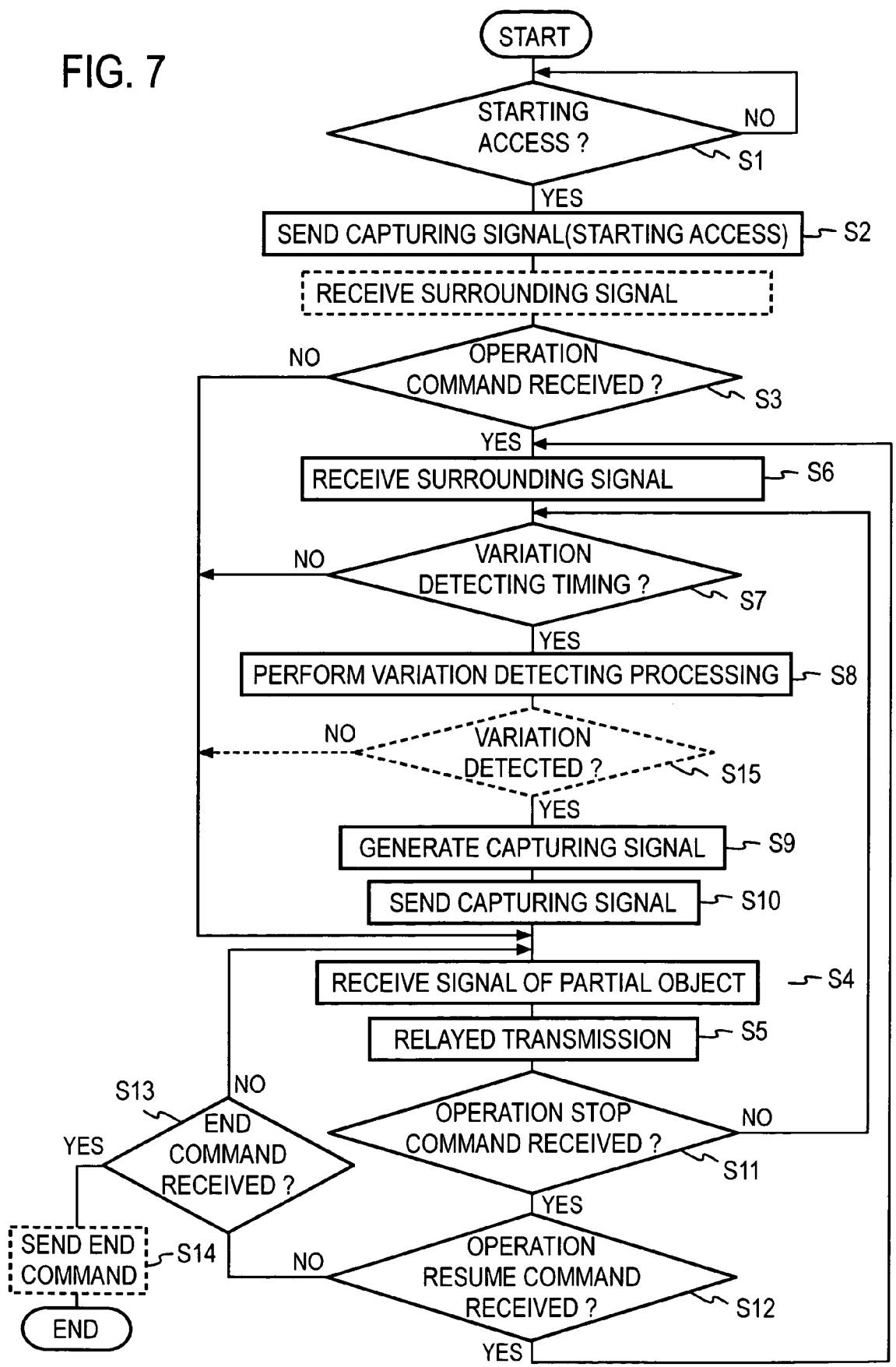
FIG. 7 is a flowchart showing an example of the procedure of an image capturing device 1 in FIG. 4.

Referring to FIG. 7, an example of the procedure of the image capturing device 1 will be described below.

Step S1: Wait for reception of the starting access from the camera-equipped portable terminal 3.

Step S2: Upon receiving the starting access, send the starting access or the capturing signal (initial value) in the previous signal memory 13a to the remote image sensing device 2.

Step S3: Decide whether a camera operation command is received.

Step S4: If no operation command is received, receive the captured signal of a partial object from the remote image sensing device, and Step S5: Send the received captured signal to the camera-equipped portable terminal 3.

Step S6: If the operation command is received in step S3, hold the command or set a flag, and receive a surrounding video signal from the camera-equipped portable terminal 3.

Step S7: Check whether the variation detecting timing is reached, and if so, then Step S8: Perform variation detection processing by the variation detecting means 12 to obtain variation information.

Step S9: Generate a new capturing signal by use of the obtained variation and the previous capturing signal, and update the previous capturing signal with the newly generated one.

Step S10: Send the newly generated capturing signal to the remote image sensing device 2, and go back to step S4.

Step S11: After step S5, decide whether an operation stop command is received, and if not, then return to step S7.

Step S12: If the top command is received in step S11, erase the operation command held so far or reset the flag, and decide whether an operation resume command is received.

Step S13: If the operation resume command is not received, decide whether an end command is received, and if not, go back to step S4.

If the variation detection timing is not reached in step S7, then go to step S4, and if the operation resume command is received in step S12, then hold the command and, for example, set a flag, followed by the return to step S6.

With such procedure as described above, when the user sends the starting access from the camera-equipped portable terminal 3 to the image capturing device 1, the captured signal of the partial object is played back and displayed on the camera-equipped portable terminal 3; if the user wants to see an image of a partial object different from that being displayed or to zoom it in or out, the camera operation command is sent from the camera-equipped portable terminal 3 to the remote image sensing device 1 for a desired camera operation, and upon displaying an image of the desired partial object, the operation stop command is sent. Thus, the user is allowed to keep on seeing the image of the partial object, for example, while carrying the camera-equipped portable terminal 3 with him. The partial object desired to see can be switched, as required, simply by issuing the operation resume command.

Upon receiving the end command in step S13, the image capturing device 1 may send the end command to the remote image sensing device 2 as required (S14) to cause the remote image sensing device 1 to end transmission of the captured signal of the partial object immediately upon receiving the end command. Another possible method is to end the transmission of the captured signal a certain time elapsed after the first sending of the captured signal of the partial object. The surrounding video signal may also be received in the interval between the reception of the starting access and the reception of the operation command as indicated by the broken line in FIG. 7. While in the above the variation detecting timing is checked in step S7 to thereby perform the variation detection processing, for example, at a preset time intervals, it is also possible to omit step S7 and perform the variation detection processing at all times. As indicated by the broken lines in FIG. 7, the variation detection processing may be followed by determining whether the currently received surrounding image differs from the previously received surrounding image, and if no change is found, the procedure goes to step S4, whereas if a change is found, the procedure goes to step S9(S15).

Embodiment 2

In Embodiment 1 the omnidirectional camera is used as the image sensing means of the remote image sensing device 2 and the image capturing device 1 sends the capturing signal to the remote image sensing device to cause it to extract the partial-object captured signal, but in Embodiment 2 an omnidirectional camera is used as image sensing means of the remote image sensing device 2, and the remote image sensing device 2 is caused to send all captured video signals to the image capturing device 1, and the image capturing device 1 extracts the partial-object captured signal from the received captured video signals.

Figure 8:
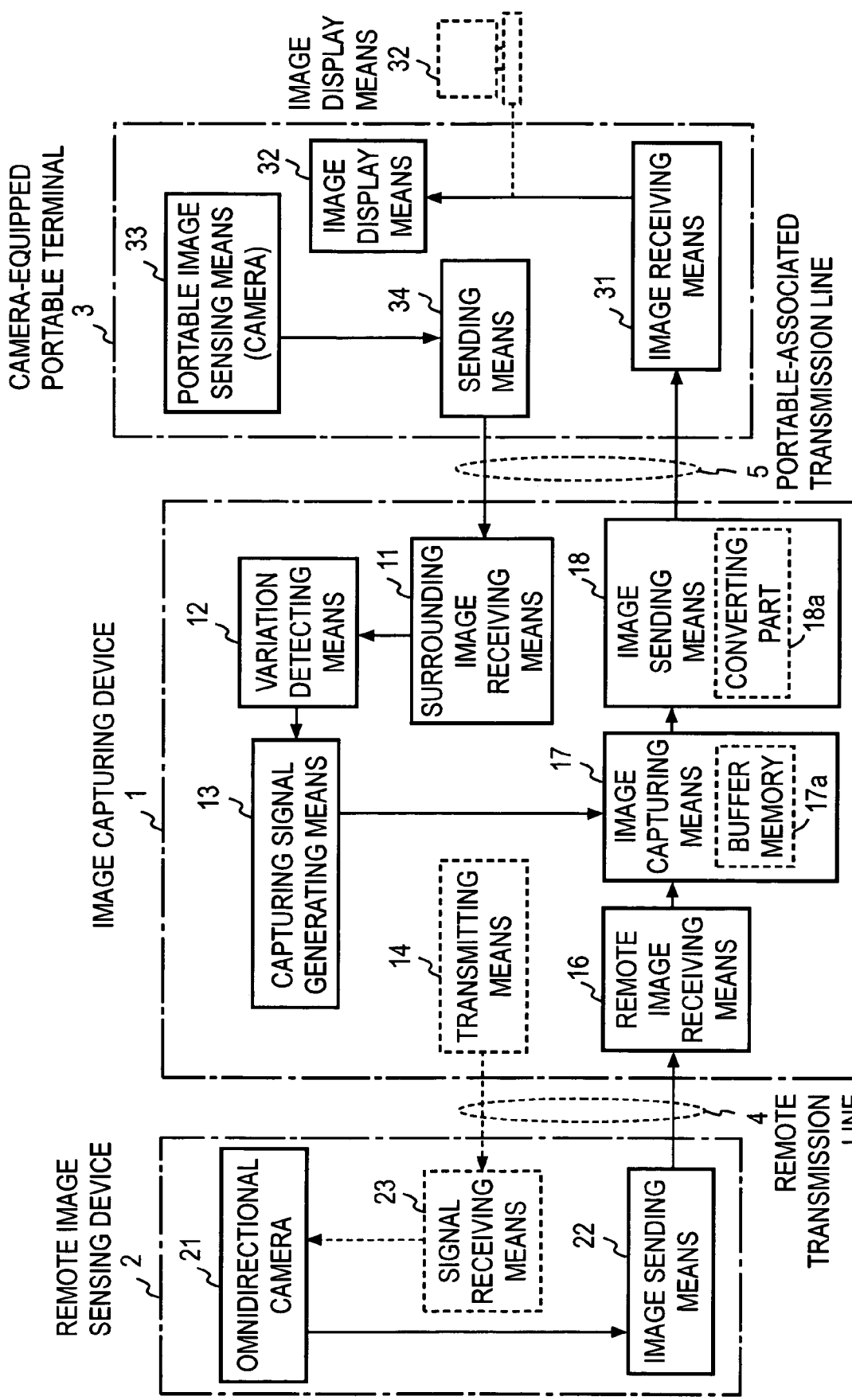
FIG. 8 is a block diagram illustrating an example of the system configuration of Embodiment 2.

FIG. 8 illustrate an example of the system configuration of this embodiment. The following description will be given only of the parts different from those in FIG. 4. In the remote image sensing device 2 the image extracting means 24 is omitted, and all the captured video signal of the omnidirectional camera 21 are sent from the video sending means 22 to the image capturing device 1. The signal receiving means 23 may be left out, but instead provision may be made such that the remote image sensing device responds to the starting access from the image capturing device 1 to start image sensing by the omnidirectional camera 21 or start transmission of captured video signals to the image capturing device 1 and responds to the end command to end the transmission of the captured video signals to the image capturing device 1.

In the image capturing device 1 there are provided remote image receiving means 16, image extracting means 17 and image sending means 18, and no capturing signal is sent to the remote image sensing device 2. The captured video signal from the remote image sensing device 2 is received by the remote image receiving means 16, and the capturing signal from the capturing signal generating means 13 is used to extract the partial-object captured signal by the image extracting means 17. For example, the received captured video signal is stored in a buffer memory 17a in the image extracting means 17; in this case, the video signal is stored with respective pixel signals arranged in the same pattern as that of the pixel arrangement in the image sensor device 7 shown in FIG. 2, for instance. By the same method as that for extracting the partial-object captured signal by the image extracting means 24 in the remote image sensing device 2 in Embodiment 1, the partial-object captured signal is read out from the buffer memory 17a based on the capturing signal in the previous memory 13a (see FIG. 5) in the capturing signal generating means, in this example, based on reference pixel position signals x, y and the zoom-in/out signal $a_p$. The thus read-out partial-object captured signal is sent from the image sending means 18 to the camera-equipped portable terminal 3. In this case, processing of the captured signal, such as the screen size conversion and compression processing, may be performed in the converting part 18a before its transmission as in Embodiment 1. The starting access and the end command may be sent, as required, by the signal sending means 14 to the remote image sensing device 2. This embodiment is identical with Embodiment 1 except the above.

Figure 9:
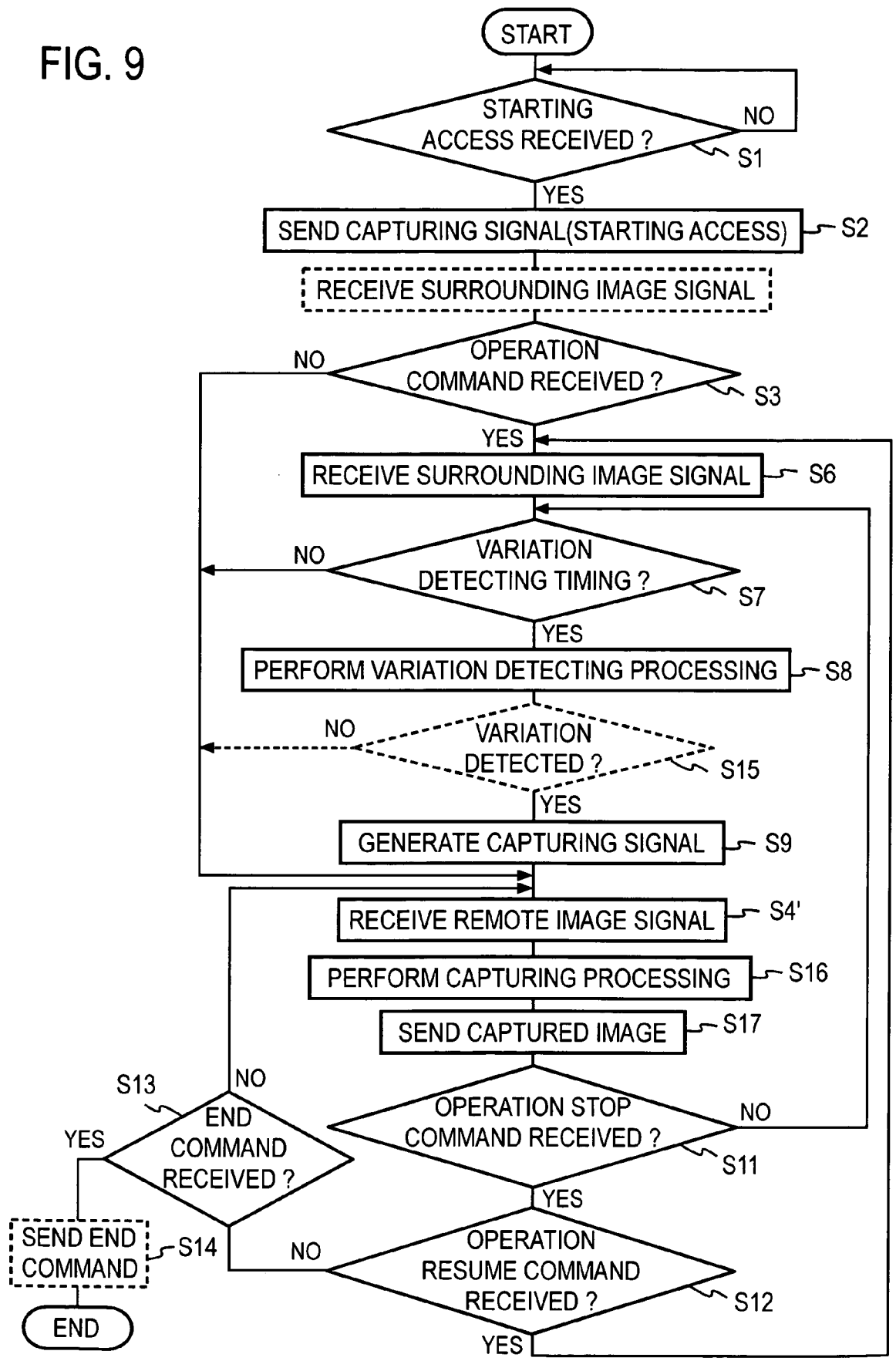
FIG. 9 is a flowchart showing an example of the procedure of the image capturing device 1 in FIG. 8.

FIG. 9 shows an example of the procedure of the image capturing device 1 in Embodiment 2. As is the case with the procedure depicted in FIG. 7, steps S1, S2 and S3 are performed. If no command for camera operation is received in step S3, the captured video signal is received from the remote image sensing device 2 in step S4', then in step S16 a partial-object captured signal is extracted from the received captured video signal based on the variation information stored in the previous signal memory 13a, and in step S17 the thus extracted partial-object captured signal is sent to the camera-equipped portable terminal 3.

After sending the captured image, the procedure goes to step S11, in which it is determined if a camera operation stop command is received as in Embodiment 1, then steps S12 and S13 are sequentially performed, and if no end command is received, the procedure goes to step S4. This embodiment is identical with Embodiment 1 except the above and produces the same working-effect as that obtainable with the latter. The flow of processing as the system is the same as in Embodiment 1 except that: the remote image sensing device 2 sends all the captured video signal to the image capturing device 1 in step F3; step F12 is omitted; and the image capturing device 1 performs the processing shown in FIG. 9.

Embodiment 3

Embodiment 3 uses a plurality of digital video cameras as image sensing means of the remote image sensing device 2, and the image capturing device 1 captures a video signal of a partial object in a panoramic object by extracting it in the remote image sensing device 2.

Figure 10:
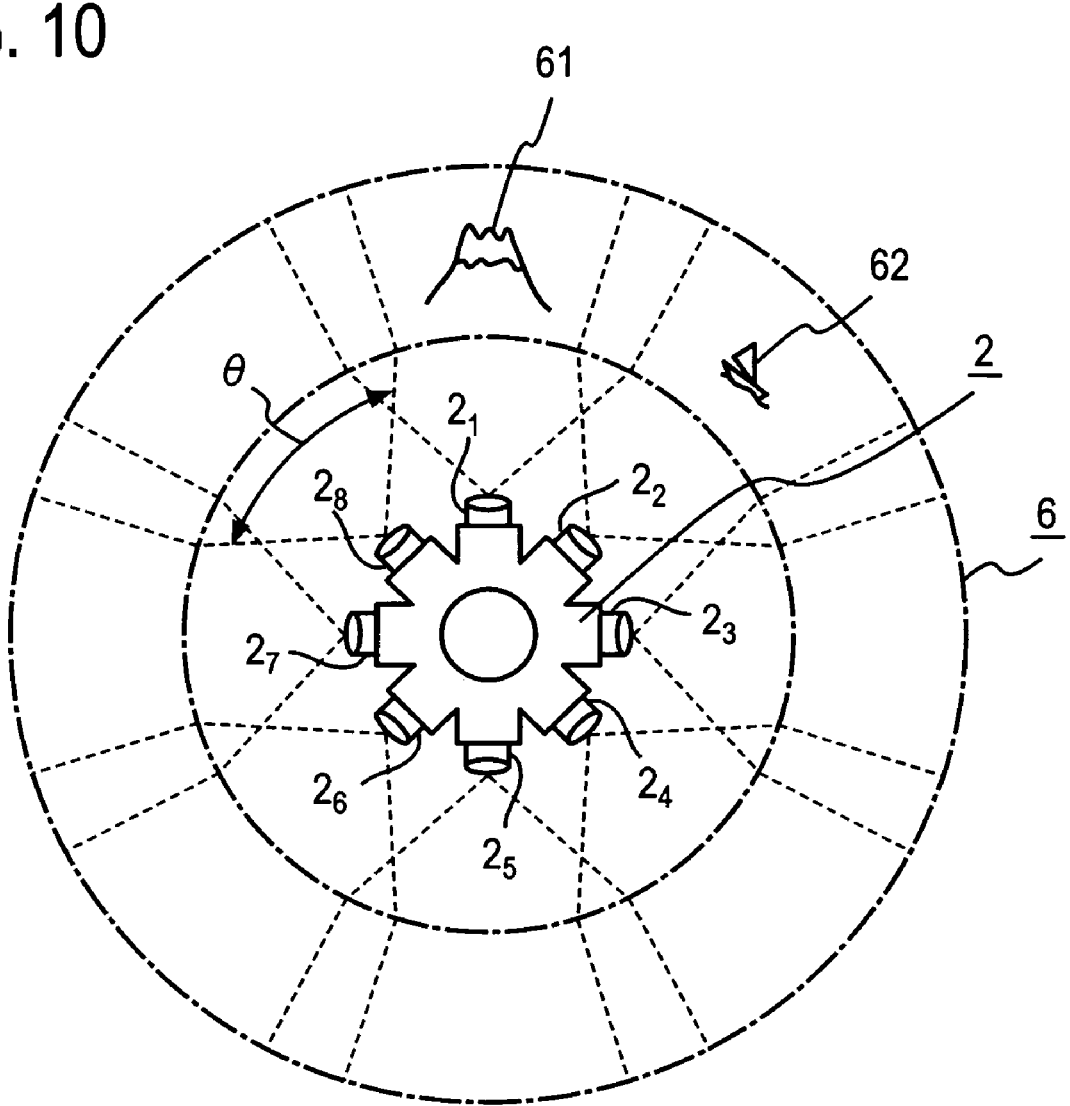
FIG. 10 is a diagram, by way of example, the relationships between a remote image sensing device 2 using plural camera devices and a panoramic object 6.

In FIG. 10 there are shown, by way of example, relationships between the remote image sensing device 2 and the panoramic object 6 in Embodiment 3. In this example, camera devices $2_1$ to $2_8$ having eight video cameras, as the remote image sensing device 2, are set over 360 degree with their shooting directions held at equal angular intervals. The viewing angles θ of the camera devices $2_1$ to $2_8$ each chosen to be a little larger than the angular distance of 45 degrees in this example so that the fields of adjacent camera devices partly overlap to permit image sensing continuous partial objects of the panoramic object. The panoramic object 6 forms a cylindrical surface at the same distance from the remote sensing device 2, but in the interests of easy understanding of partial objects, the panoramic object 6 is shown with its lower diameter smaller than the upper one.

For example, the camera device $2_1$ shoots the partial object 61, and the camera device $2_2$ shoots the partial object 62 in the direction 45 degrees away to the right from the direction of shooting the partial object 61. With this remote image sensing device 2, it is possible to shoot any of the partial objects into which the panoramic object 6 is divided equally by the number 2, of camera devices used. Incidentally, the number of camera devices is not limited specifically eight. The angular distance of the shooting direction needs not always be equal, that is, when the panoramic object 6 contains a part unnecessary to see, the camera devices are so directed as not to shoot such an unnecessary part.

Figure 11:
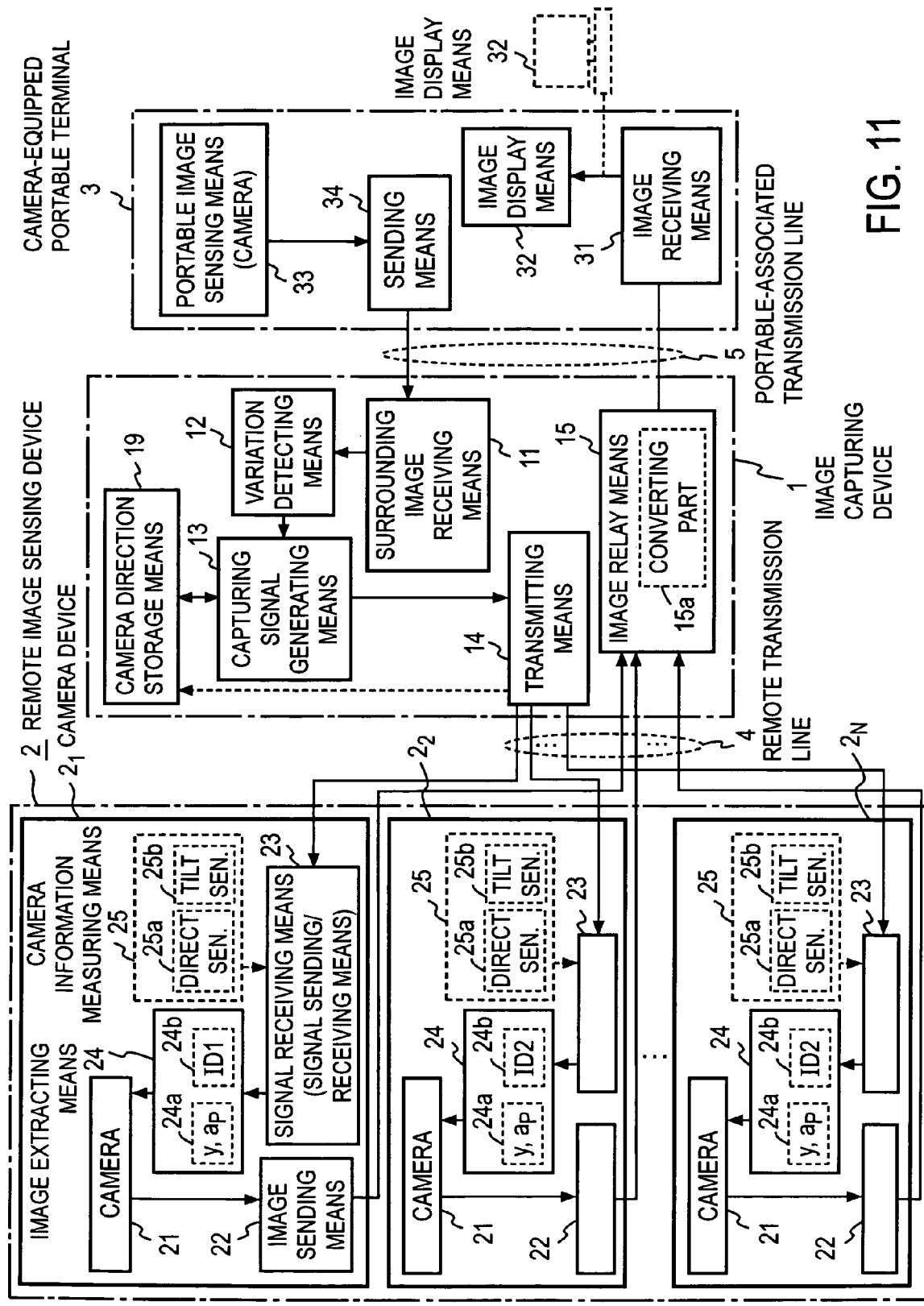
FIG. 11 is a block diagram illustrating an example of the system configuration of Embodiment 3.

An example of the system configuration of Embodiment 3 is illustrated in FIG. 11. A description will be given only of the parts different from those in the FIG. 4 configuration. The remote image sensing device 2 has a plurality of camera devices $2_1$ to $2_N$ disposed as shown in FIG. 10, for instance. The camera devices $2_1$ to $2_N$ have the same construction, which will be described below in connection with the camera device $2_1$. The image extracting means 24 is used as in the case of FIG. 4, but its construction and processing (operation) differs from the image extracting means 24 in FIG. 4. That is, the capturing signal received from the image capturing device 1 is composed of camera identification information IDp and, if necessary, a zoom parameter $a_p$ or/and a position parameter y. Accordingly, the image extracting means 24 is provided with a storage part 24a for storing $a_p$, y and ID storage part 24b for storing the camera identification information ID1 of the camera device $2_1$. When either one of $a_p$ and y is not used, the storage part 24a is omitted.

When the camera identification information IDp in the capturing signal received by the signal receiving means 23 matches the camera identification information, ID1 in this example, stored in the ID storage part 24b, the camera 21 of the camera device $2_1$ begins shooting and image capturing processing is performed; otherwise, the camera 21 is always held in shooting state and images are captured from the camera 21. The stored contents $a_p$ and y in the storage part 24a are updated with $a_p$ and y in the capturing signal, respectively.

Figure 12:
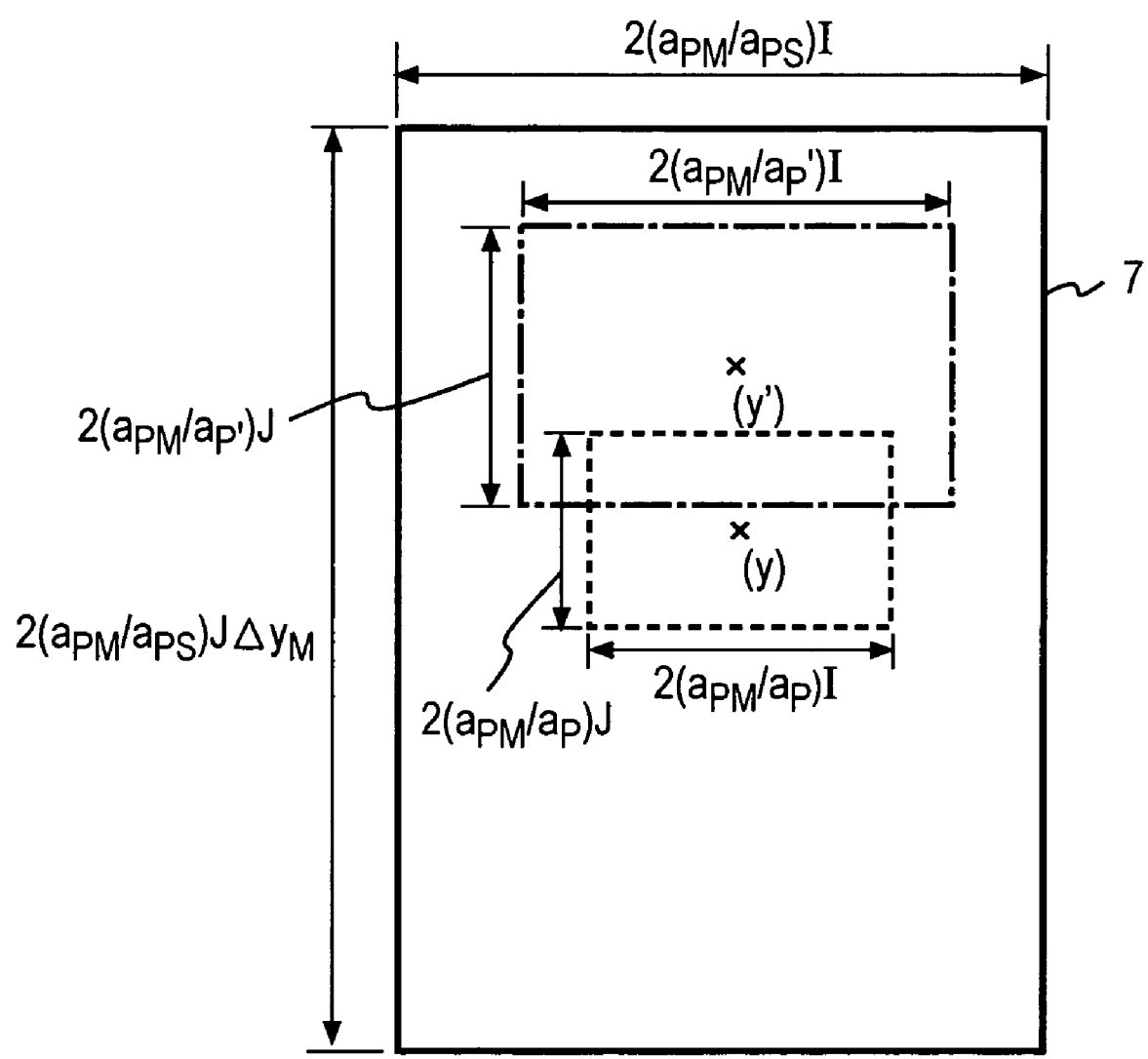
FIG. 12 is a diagram for explaining an image sensor device of the camera device in FIG. 11 and the extraction of a captured signal of an partial object.

The image extraction processing can be performed substantially in the same manner as in the case of Embodiment 1, but when $a_p$ and y are not used, the image signal output from the camera 21 is captured as a partial-object captured signal from the camera 21 and input to the image sending means 22. The image sensor device 7 of the camera 21 is rectangular, for instance, as depicted in FIG. 12; the breadth is defined by the number of pixels, $2(a_{PM}/a_{PS})I$, which is a value obtained by multiplying the number of horizontal (x-direction) pixels of the image to be displayed, 2I, by a value $(a_{PM}/a_{PS})$ which is obtained by dividing the maximum value $a_{PM}$ of $a_p$ by the minimum value as of $a_p$, and th length is defined by the number of pixels, $2(a_{PM}/a_{PS}) \cdot \Delta y_M \cdot J$, that is a value obtained by multiplying the number of vertical (y-direction) pixels, 2J, of the image to be displayed by $^2(a_{PM}/a_{PS})$ and further multiplying by the number of pixels, $\Delta y_M$, for the maximum tilt angle (of elevation/depression). Conversely, the minimum value $a_{PS}$ of $a_p$ is determined by the number of pixels in the breadth wise direction of the device 7, and the maximum tilt angle (of elevation/depression) $\Delta y_M$ is determined by the minimum value $a_{PS}$ based on the number of pixels in the lengthwise direction of the device 7.

For example, if the parameters stored in the storage part 24a are $a_p$ and y, signals of pixels $((a_{PM}/a_p)i, y+(a_{PM}/a_p)j)$ $(i=0, \pm 1, \ldots, \pm I, j=0, \pm 1, \ldots, \pm J)$ captured as a partial-object captured signal from an area 71 of a breadth $2(a_{PM}/a_p)I$ and a length $2(a_{PM}/a_P)J$ with its center at a position y on a bisector (center line) of the device 7 in the x-direction in FIG. 12, and when the parameters are updated with $a_p$ and y', signals of pixels $((a_{PM}/a_P)i, y'+(a_{PM}/a_P)j)$ are captured as a partial-object captured signal from an area 72 of a breadth $2(a_{PM}/a_P)I$ and a length $2(a_{PM}/a_P)J$ with its center at a position y' on the center line.

Figure 13:
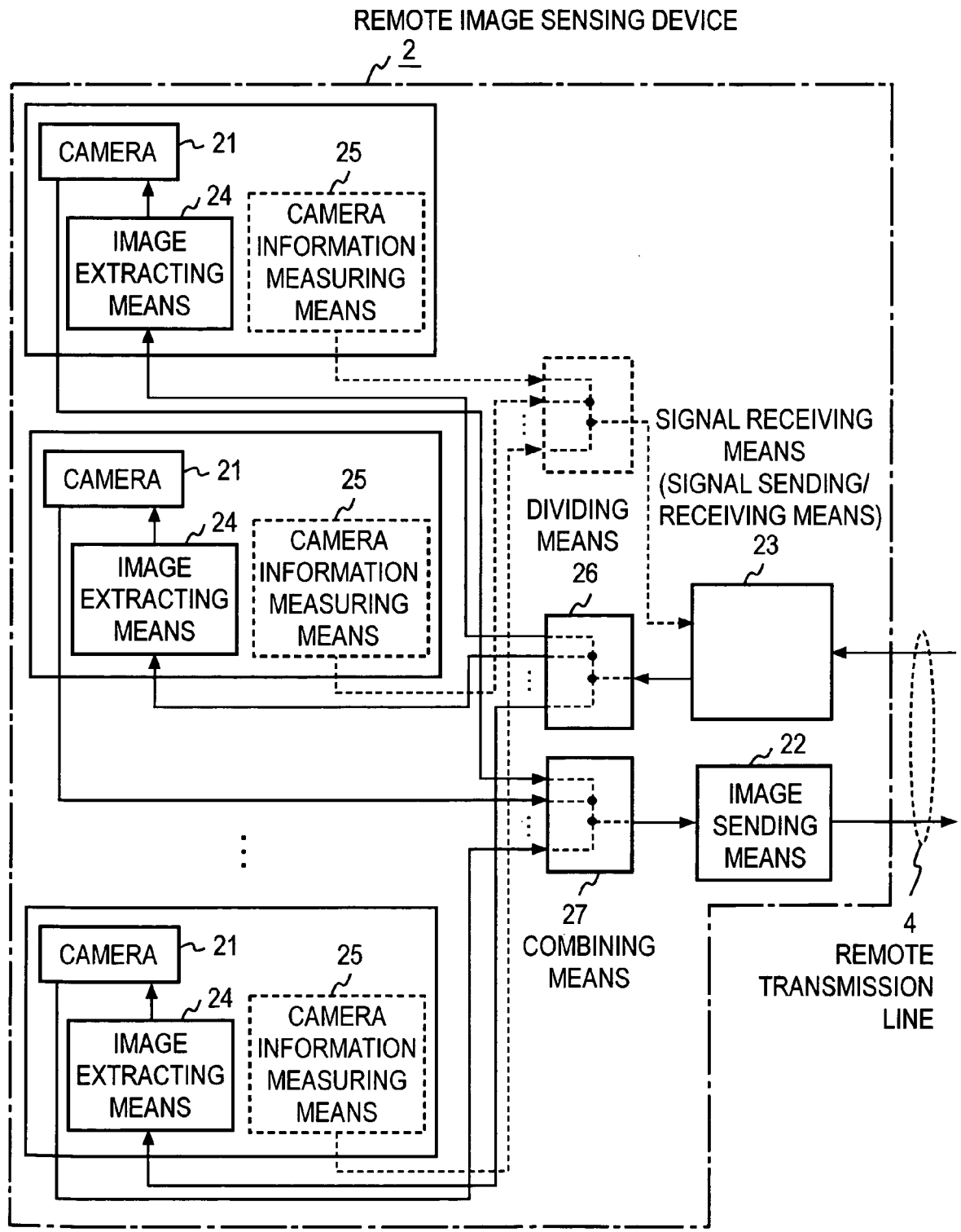
FIG. 13 is a block diagram showing a modified form of the remote image capturing device 2 in FIG. 11.

As described above, in the remote image sensing device 2 the partial-object captured signal is taken out from any one of the camera devices $2_1$ to $2_N$ in accordance with the capturing signal sent from the image capturing device 1, and the signal is sent by the image sending means 22 to the image capturing device 1. The remote image sensing device 2 and the image capturing device 1 may be interconnected as shown in FIG. 11, in which the camera devices $2_1$ to $2_N$ are connected via partial lines to the image capturing device 1, but the remote image sensing device 2 and the image capturing device 1 may also be connected via one two-way transmission line 4 as depicted in FIG. 13. That is, the capturing signal from the image capturing device 1 is received by the signal receiving means 23, then the received capturing signal is distributed by dividing means 26 to the image extracting means 24 of each of the camera devices $2_1$ to $2_N$, then the partial-object captured signals from the respective cameras 21 of the camera devices $2_1$ to $2_N$ (normally, from only one of them) are combined by combining means 27, and the combined partial-object captured signal is send by the image sending means 22 to the image capturing device 1.

Figure 14:
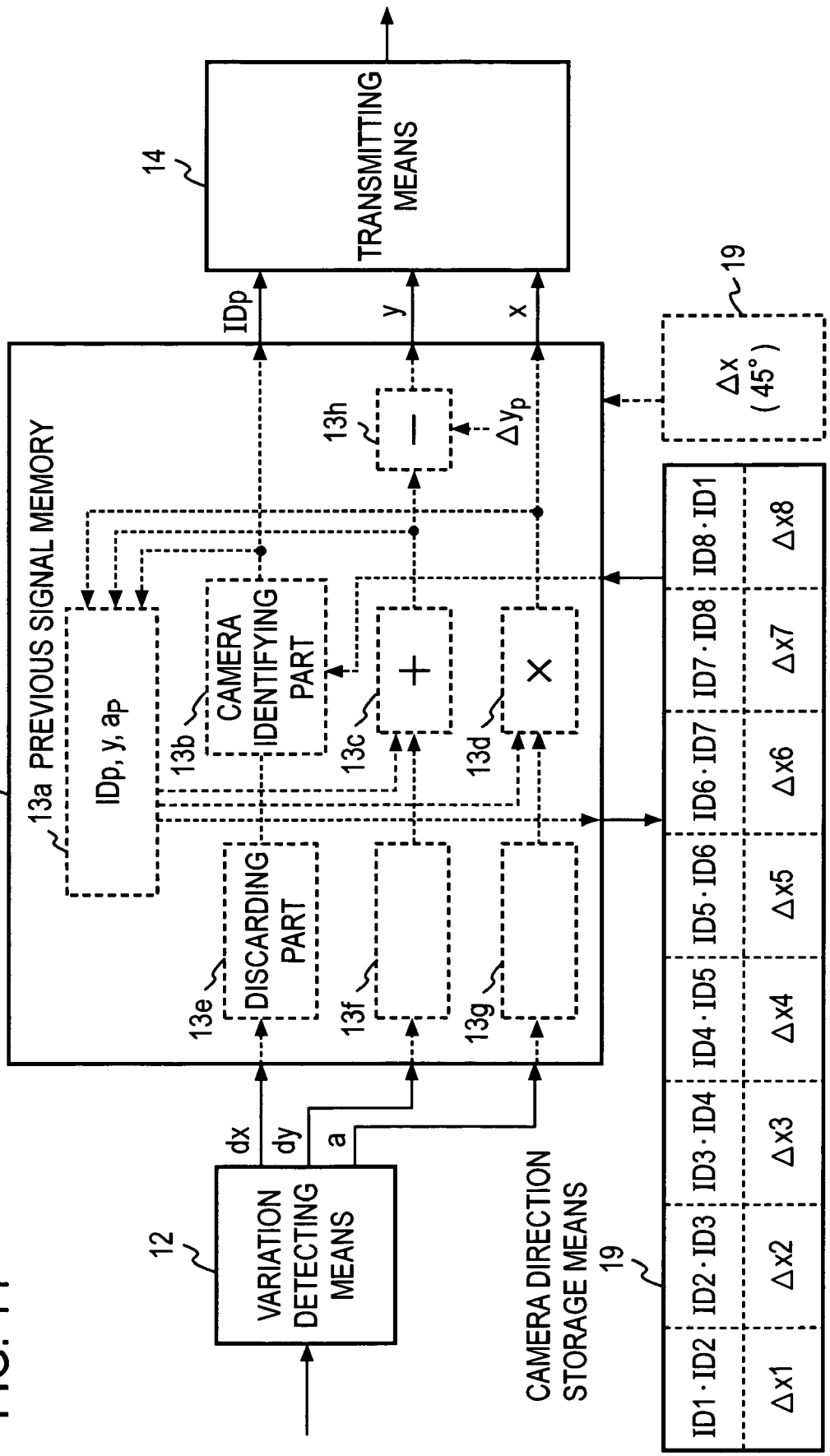
FIG. 14 is a diagram showing an example of a concrete functional configuration of capturing signal generating means 13 and an example of stored contents of camera direction storage means 19 in FIG. 11.

Turning back to FIG. 11, in the image capturing device 1 direction information corresponding to the shooting direction of each of the camera devices $2_1$ to $2_N$ is stored in camera direction storage means 19 in correspondence to the camera identification information IDi of each camera device. For example, an angle between the shooting directions of adjacent camera devices is stored. FIG. 14 shows an example. In FIG. 14, the number N of camera devices $2_N$ is 8, and respective pieces of camera identification information of the camera devices $2_1$ to $2_N$ are represented by ID1 to ID8. The angular distance $\Delta x1$ between the camera devices $2_1$ and $2_2$ in the shooting direction (a value in terms of number of pixels of the captured image on the display surface; the same applied to the following description) is stored for ID1·ID2, and the angular distance $\Delta x2$ between the camera devices $2_2$ and $2_3$ in the shooting direction is stored for ID2·ID3, and the angular distances between the other adjacent camera devices are similarly stored.

The capturing signal generating means 13 somewhat differs in construction and processing (operation) from the counterpart in FIG. 4. In FIG. 14 there is shown an example of its functional configuration. In this example the variation detecting means 12 is shown to detect, as the variation information, the direction information $d_x$, $d_y$ and the zoom information a by such configuration and method as referred to previously with reference to FIG. 5. In the previous signal memory 13a, the previous camera identification information IDp, the y-direction position y and the zoom amount $a_p$ are stored. As their initial values, predetermined camera identification information ID1 is set for the identification information IDp, y=0, and the zoom amount $a_p$ is set at an intermediate value between its maximum and minimum values.

The information $d_x$ is input to a camera identifying part 13b. The processing in the camera identifying part 13b will be described below with reference to FIG. 15. If the sign of $d_x$ is positive (S21), the angle $\Delta x_{+1}$ between the camera shooting direction in the previous camera identification information IDp and the camera shooting direction in the current camera identification information IDp+1 is read out of the camera direction storage means 19 using IDp·IDp+1 as an address (S22). A check is made to determine whether $d_x$ is equal to or greater than $_{\Delta x+1}$ (S23), and if it is equal to or greater than $\Delta x_{+1}$, IDP+1 is output (S24), and if it is not equal to or greater than $\Delta x_{+1}$, IDp is output intact (S25).

Figure 15:
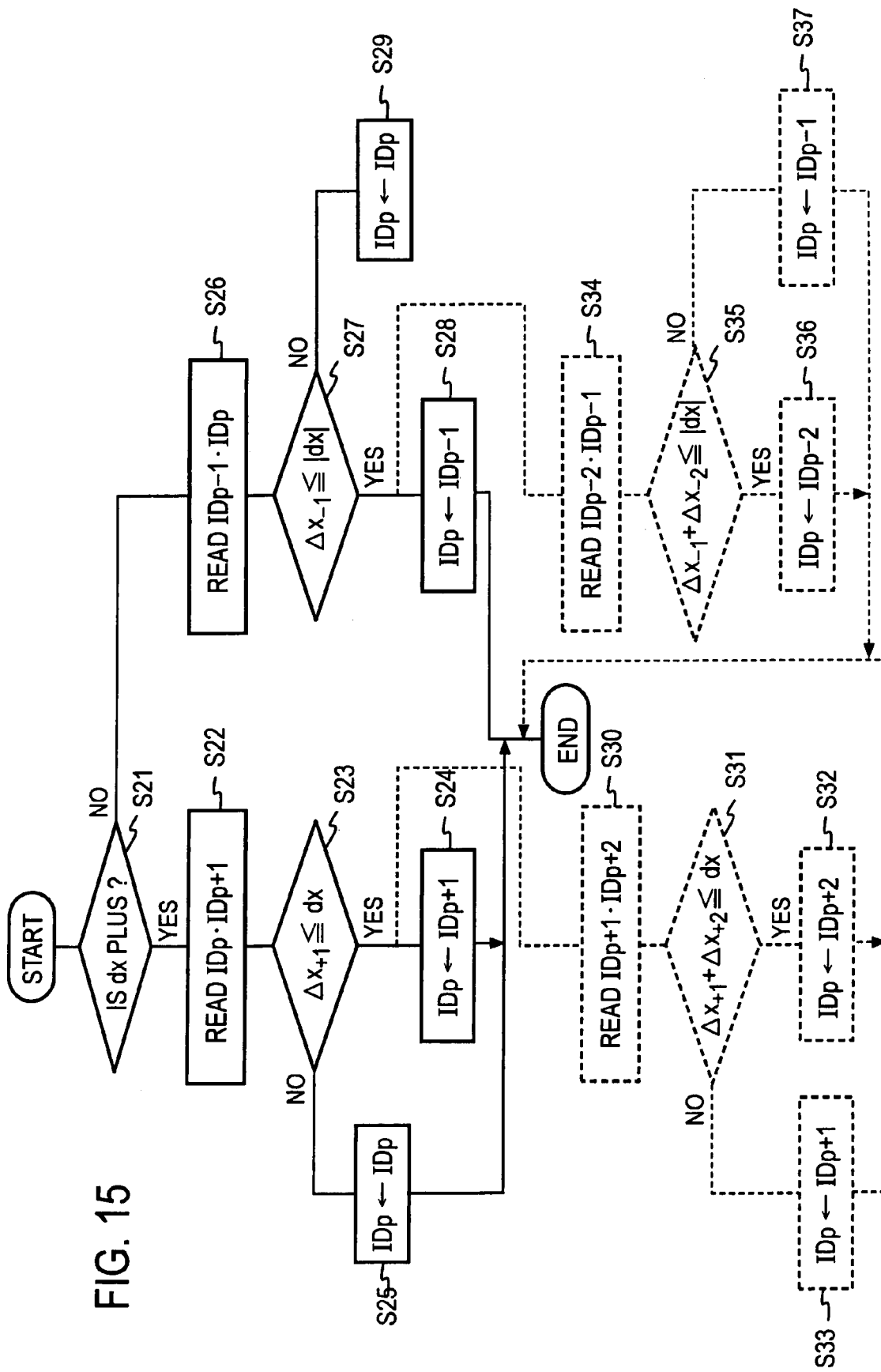
FIG. 15 is a flowchart showing an example of the procedure of a camera determining part 13b in FIG. 14.

If the sign of $d_x$ is not positive in step S21 then the angle $\Delta x_{-1}$ between the camera shooting directions in IDp−1 and IDp is read out of the storage means 19 using IDp−1·IDp as an address (S26), then a check is made to determine whether the absolute value of $d_x$ is equal to or greater than $\Delta x_{-1}$ (S27), and if so, IDp−1 is output (S28), and if it is not equal to or greater than $\Delta x_{-1}$, IDp is output intact (S29).

Where the angular distance between the shooting directions of adjacent camera devices is small, or where the shooting direction of the camera-equipped portable terminal 3 is suddenly changed a relatively large angle, steps S24 and S28 are omitted as indicated by the broken lines in FIG. 15; if $d_x$ is equal to or greater than $\Delta x_{+1}$ in step S23 the angular distance from the shooting direction of the adjoining camera, that is, the angular distance $\Delta x_{+1}$ between the camera shooting directions in IDp+1 and IDp+2, is read out from the storage means 19 (S30), then a check is made to determine whether $d_x$ is equal to or greater than $\Delta x_{+1}+\Delta x_{+2}$ (S31), and if so, IDp+2 is output (S32), and if it is not equal to or greater than $\Delta x_{+1}+\Delta x_{+2}$, IDp +1 is output (S33).

When $|d_x|$ is equal to or greater than $\Delta x_{-1}$ in step S27, the angular distance from the shooting direction of the adjoining camera, that is, the angular distance $\Delta x_{-2}$ is read out of the storage means 19 using IDp−2·IDp−1 (S34), and a check is made determine whether $|d_x|$ is equal to or greater than $\Delta x_{-1}+\Delta x_{-2}$ (S35), and if so, IDp−2 is output (S36), and if not so, IDp−1 is output (S37). Similarly, the angular distances from camera shooting directions of further distant cameras can be decided.

Where the angular distances between the shooting directions of adjacent cameras are all equal as in the FIG. 10 example, only the number of pixels $\Delta x$ corresponding to that angle, 45 degrees in this example, is stored in the camera direction storage means 19 as indicated by the broken lines, and steps S22 and S26 are omitted; in step a check is made to determined if $\Delta x \leq d_x$, and in step S27 a check is made to determine if $\Delta x \leq |d_x|$. For large-angle camera operation, steps S24, S28, S30 and S34 in FIG. 15 are omitted as indicated by the broken lines, then in step S31 a check is made to see if $2\Delta x \leq d_x$, and in step S35 a check is made to see if $2\Delta x \leq |d_x|$. In this instance, too, the angular distances from camera shooting directions of further distant cameras can similarly be decided.

Turning back to FIG. 14, the capturing signal generating means 13 will be described below. As for the input pieces of information $d_y$ and a, $d_y$ is added with the previous information y in the adding part 13c and a is multiplied by the previous information $a_p$ in the multiplying part 13d as described previously with respect to FIG. 5. The outputs from the respective parts 13b, 13c and 13d are provided to the signal sending means 14, while at the same time the contents of the previous signal memory 13a are updated in the same manner as described previously. For the respective inputs, the discarding parts 13e, 13f and 13g may be provided. In this instance, when $d_x$ is equal to or smaller than a preset value in the discarding part 13e, the present value IDp (IDp in the memory 13a) is output without the processing in the camera identifying part 13b.

In the camera direction storage means 19 there may be prestored the angles of shooting directions of the camera devices with respect to the direction shooting of a predetermined one of them as depicted in FIG. 16, for instance. In the example of FIG. 16, the shooting direction of the camera device of the camera identification information ID4 is used as a standard of reference and the angles of the shooting direction of each of the other seven camera devices with respect to this reference direction is stored as the number of pixels in one frame of the captured image. In this case, in the processing shown in FIG. 15, the angles in IDp and IDp+1 are read out, for example, in step S22 and it is decided whether $d_x$ is equal to or greater than the difference between the two angles.

According to the usage pattern, when the direction of the partial object that the user wants to see first is predetermined, it is necessary that the respective pieces of camera identification information be made to correspond to north, south, east and west directions, for example, north, northeast, east, . . . directions. The correspondences between the camera identification information and the north, south, east and west directions may be defined by predetermining the shooting direction of the camera device of each camera identification information and placing the remote image sensing device 2 accordingly. In some case, however, such placement of the remote image sensing device 1 is time-consuming. To avoid this, as shown in FIG. 11, camera information measuring means 25 is provided in each of the camera devices $2_1$ to $2_N$, and the angle of the shooting direction with respect to true north is measured by a magnetic compass or similar direction sensor 25a of the camera information measuring means 25 to obtain the information about the shooting direction of each camera device in north, south, east, or west direction. In the illustrated example, a tilt angle sensor 25b as by a gravitational accelerometer is also provided, by which is detected a value $\Delta y$ that represents, in terms of the number of pixels on the frame of the captured image, the angle of the shooting direction to the horizontal plane, that is, the angle (angle of elevation/depression) of the y-axis of the image sensor device 7 of the camera 21. The north, south, east or west direction and the tilt angle Ayn measured by the camera information measuring means 25 are sent, together with the camera identification information IDn of the camera device $2_n$ (n=1, . . . , N), to the image capturing device 1 by the signal sending/receiving means 23 as indicated by the term in parentheses in FIGS. 11 and 13. The image capturing device 1 receives from each camera device $2_n$ its identification information IDn, north, south, east or west direction and tilt angle Ayn by the signal sending/receiving means 14 and stores them in the camera direction storage means 19 in correspondence to the identification IDn as shown in FIG. 16, for instance.

When the user makes a starting access to the image capturing device 1, the image capturing device 1 reads out the identification information of the camera, ID3 in the FIG. 16 example, whose shooting direction is a predetermined one of the north, south, east and west directions, for example, north direction—ID3 in the FIG. 16 example—and the elevation/depression angle Δy3, and sends these read-out values to the remote image sensing device 2, if necessary, together with the initial value $a_p$ of the zoom in/out parameter (zoom value). The initial value $a_p$ may be prestored in the storage part 24a of the image extracting means 24 in each of the camera devices $2_1$ to $2_N$. The elevation/depression angle Δyn is subtracted from the output from the adding part 13c in a correcting part 13h in FIG. 14, and is fed to the signal sending means 14. The updating of y in the previous signal memory 13a is performed using the value yet to be corrected in the correcting part 13h. For example, where the user wants to see a partial-object image with reference to the horizontal direction, if the camera shooting direction is a little upward with respect to a horizontal plane, the partial-object image formed on the image sensor device 7 of the camera 21 is shifted upwards from a partial-object image in the horizontal direction by a value corresponding to the upward shooting direction, that is, by Δyn. Hence the subtraction of Δyn in the correcting part 13h provides a partial-object image with reference to the horizontal direction. Incidentally, the initial value of y is set at y=0.

As described above, in response to the capturing signal from the image capturing device 1 a partial-object video signal is sent from the camera device $2_n$ to the image capturing device 1 to capture the signal, which is relayed and sent to the camera-equipped portable terminal 3 as in the case of Embodiment 1; accordingly, it can easily be understood that the user can see the panoramic object directly and select its partial object while operating the camera of the portable terminal 3 as in Embodiment 1. The procedure of the image capturing device 1 in this instance is the same as shown in FIG. 7. The procedure in this case may also be changed such that upon receiving the starting access, the image capturing device sends it to the remote image sensing device 2, which responds to the starting access to send a partial-object captured signal from a predetermined camera device $2_n$ to the image capturing device 1.

Embodiment 4

In the case of using the plurality of camera devices $2_1$ to $2_N$ as the remote image sensing device 2, too, the image capturing device 1 can extract a partial-object captured signal from the video signal received from the remote image sensing device 2 as in the case of Embodiment 2. Embodiment 4 concerns this operation, and its differences from Embodiment 3 will be described with reference to FIG. 17.

In the remote image sensing device 2, the image extracting means 24 of each of the camera devices $2_1$ to $2_N$ is omitted, and the video signal from each camera 21 is sent by the image sending means 22 to the image capturing device 1. In this instance, the camera identification information IDn stored in the ID storage part 24b, for instance, is added to the video signal of the camera 21 to enable the image capturing device 1 to recognize the camera device $2_n$ from which the video signal is received. Incidentally, if input terminals of the remote image receiving means 16 in the image capturing device 1 are predetermined corresponding to the camera devices $2_1$ to $2_N$, there is no need for sending the camera identification information IDn. The image sending means 22 may be provided for each of the camera devices $2_1$ to $2_N$, but it may also be provided in common to them. Furthermore, the camera information measuring means 25 may be provided as required.

In the image capturing device 1 the image relay means 15 is omitted, and in the image extracting means 17 a selecting part 17b selects that one of the video signal from the camera device $2_1$ to $2_N$ which corresponds to the camera identification information IDp contained in the capturing signal from the capturing signal generating means 13. In other words, that one of the received signal whose camera identification information IDn matches IDp is selected. This selection may be made by the image extracting means 17 itself. Further, the image extracting means 17 has the buffer memory 17a that is the same as in FIG. 8, and in this buffer memory 17a the video signal is stored with its pixel signals arranged in the same pattern as that of the pixel arrangement in the image sensor device 7 shown in FIG. 12, for instance; and the image extracting means 24 extracts the partial-object captured signal in accordance with $a_p$ and/or y in the capturing signal as described previously with reference to FIG. 12.

When the capturing signal contains only IDp, the buffer memory 17a may be dispensed with. The selection of the video signal may be done by a selecting part 16a in the image receiving means 16 in place of the selecting part 17a; alternatively, as described previously, the receiving terminals of the image receiving means are predetermined corresponding to the camera devices $2_1$ to $2_N$, respectively so that the receiving terminal corresponding to the information IDp is selected to select the received image signal.

On being accessed for starting from the camera-equipped portable terminal 3, the image capturing device 1 captures a partial-object video signal corresponding to predetermined camera identification information or predetermined one of the north, south, east and west directions, and sends the captured signal to the camera-equipped portable terminal 3. The procedure of the image capturing device 1 in the system of Embodiment 4 is the same as the procedure shown in FIG. 9. Hence, it will easily be understood that Embodiment 4 also produces the same working-effect obtainable with Embodiments 1 to 3.

Embodiment 5

Figure 18:
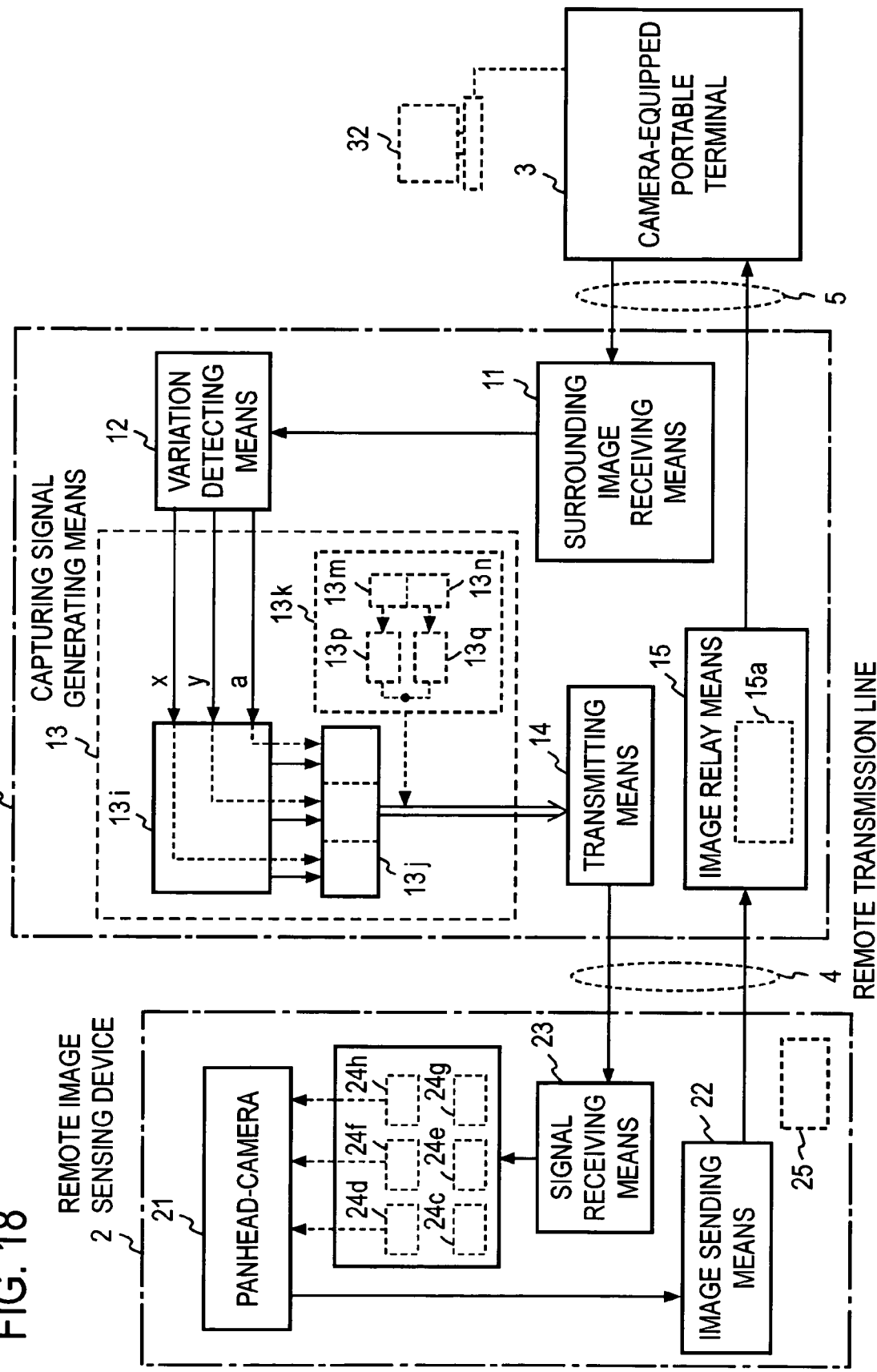
FIG. 18 is a block diagram illustrating an example of the system configuration of Embodiment 5.

Embodiment 5 uses, as the image sensing means of the remote image sensing device 2, a video camera mounted on a panhead. FIG. 18 illustrates an example of the system configuration of this embodiment. A description will be given of differences from FIG. 4 configuration.

Figure 19:
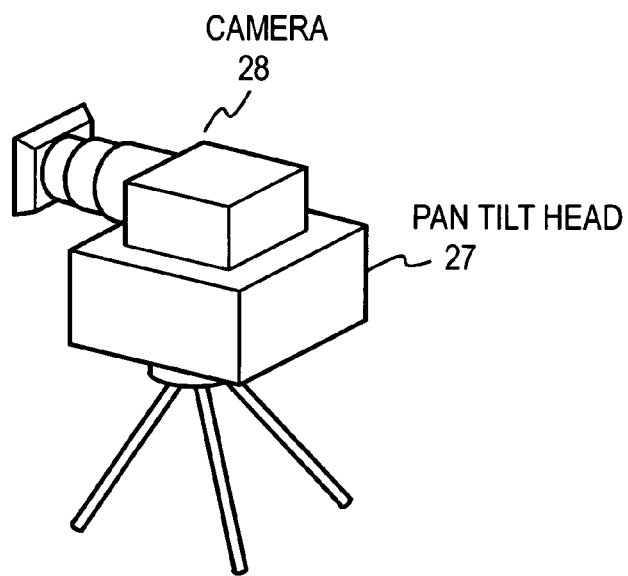
FIG. 19 is a diagram showing an example of the outward appearance of a panhead camera in FIG. 18.

The image sensing means 21 of the remote image sensing device 2 is a video camera 28 mounted on a panhead 27 as shown in FIG. 19; the shooting diction of the camera 28 can be changed by a control signal from a remote location, and the field angle, i.e., what is called zoom amount, can also be changed by the lens. The image sensing means 21 will hereinafter be referred to as a panhead camera 21. To the image extracting means 24 are input, as capturing signals, an azimuth signal θ, an elevation/depression angle signal φ and a zoom signal Z from the image capturing device 1. An azimuth control signal 24c controls an azimuth angle control mechanism 24d according to the azimuth signal θ, causing the azimuth angle of the shooting direction of the camera 21 to become θ. An elevation/depression control part 24e controls an elevation/depression control mechanism 24f according to the elevation/depression angle signal φ, causing the elevation/depression angle of the shooting direction of the camera to become φ. A zoom control part 24g controls a zoom control mechanism 24h according to the zoom signal Z, causing the zoom amount of the camera 21 to become Z. These control parts 24c, 24e, 24g and control mechanisms 24d, 24f, 14h may be the same as those built in the panhead 27 of a commercially available remotely controlled panhead camera.

Thus the partial-object image signal in the panoramic object 6 corresponding to the capturing signals is taken out from the camera 21 and sent to the image capturing device 1. The remote image sensing device 2 can also be provided with the camera information measuring means 25 described previously with respect to FIG. 11.

In the image capturing device 1, the capturing signal generating means 13, such as shown in FIG. 5, generates signals z, x and $a_p$ based on the variation information detected by the variation detecting mean 12, and these signals x, y and $a_p$ are converted by a converting part 13j to direction signals of the azimuth signal θ and the elevation/depression angle signal φ, and a zoom change signal of the zoom signal Z, which are sent to the remote image sensing device 2.

Upon sending a starting access from the image capturing device 1 to the remote image sensing device 2, the remote image sensing device 2 sends to the image capturing device 1 a partial-object video signal obtained by shooting in a preset reference direction and with a reference zoom amount. In the remote image sensing device 2 camera information measuring means 25 is provided, and in the case where the image capturing device 1 responds to a starting access to obtain a partial-video signal in a predetermined direction, for example, in the north direction and in the horizontal direction, an initial signal generating part $13_k$ generates initial capturing signals. That is, the azimuth angle $θ_i$ and elevation/depression angle $φ_i$ measured by the camera information measuring means 25 of the remote image sensing device 2 are stored in storage parts $13_m$ and $13_n$, respectively, and direction-containing angle signals of differences between the stored angles $θ_i, φ_i$ and predetermined reference azimuth angle and reference elevation/depression angle are calculated in reference calculating parts 13p and 13q, and these signals are sent as initial capturing signals to the remote image sensing device 2. That is, the difference between the current shooting direction of the panhead camera 21 and the reference direction is sent as the capturing signal to the remote image sensing device 2, which responds to the capturing signal to control the panhead camera 21 to change its shooting direction by the above-mentioned difference. As regards the zoom amount Z, the initial capturing signal is zero in difference. In the case of effecting such control, the capturing signals based on the variation information detected by the variation detecting means 12, which indicate the current conditions of the panhead camera 21, that is, only variations in the shooting direction and in the zoom amount, are also sent to the remote image sensing device 2. Accordingly, as depicted in FIG. 18, for instance, the pieces of variation information $d_x$, $d_y$ and a detected by the variation detecting means 12 are directly input to a converting part $13_j$ of the capturing signal generating means 13, and respective converted outputs are sent as generated capturing signals to the remote image sensing device 2. The remote image sensing device 2 controls the azimuth control mechanism $24_d$, the elevation/depression control mechanism $24_f$ and the zoom amount control mechanism $24_h$ by the variations represented by the received capturing signals corresponding to them, respectively.

As described above, not only in the case of using a predetermined one of the north, south, east and west directions as a reference but also in the case of using the initial condition of the panhead camera as a reference, it is also possible to: generate capturing signals representing variations corresponding to the variation information detected by the variation detecting means 12; send the capturing signals to the remote image sensing device 2; and effects control in the remote image sensing device 1 to change the current direction or/and zoom amount of the panhead camera 21 by the amounts of variation indicated by the received capturing signals. The he method in which the capturing signals representing only variations based on the variation information is generated and sent to the remote image sensing device 2 is also applicable to Embodiments 2 and 4. In this instance, in Embodiment 1, for example, the same capturing signal generating means as that 13 in FIG. 5 is provided in the remote image sensing device 2.

Embodiment 6

Figure 20:
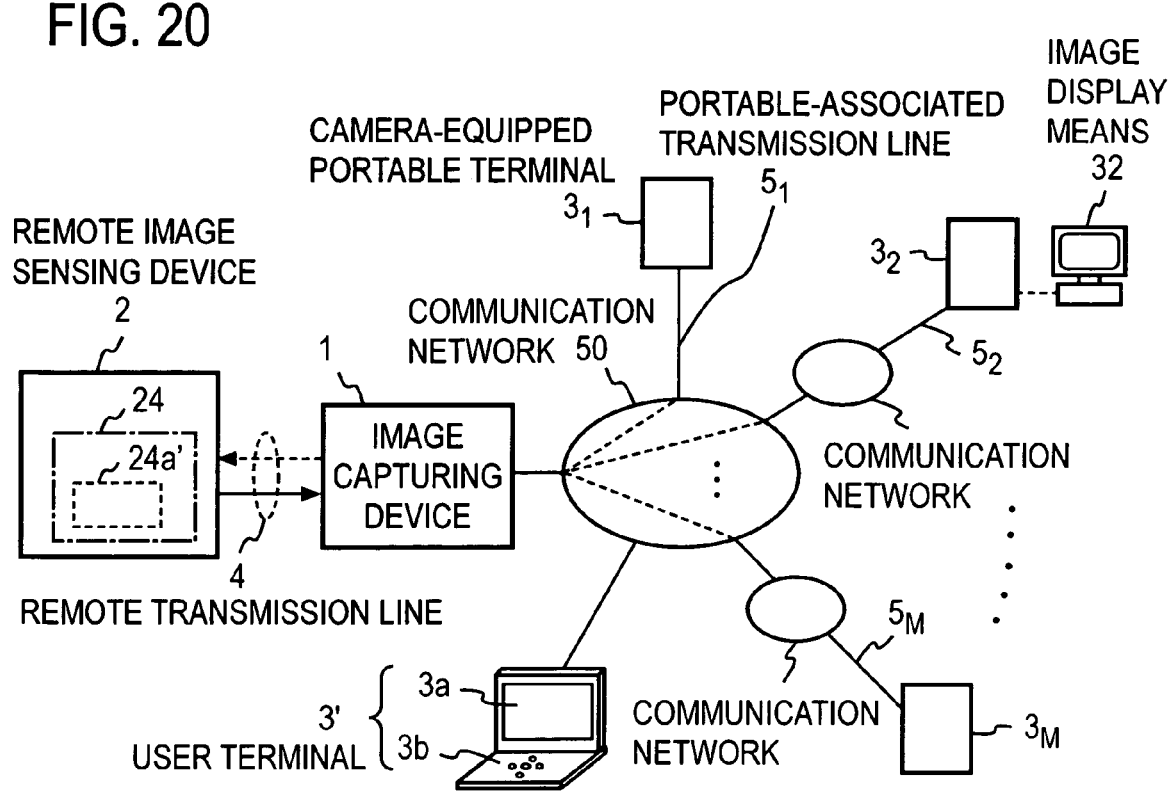
FIG. 20 is a block diagram illustrating an example of the system configuration of Embodiment 6.

Embodiment 6 is so adapted as to permit a plurality of users to use the remote image sensing device 2. For example, as depicted in FIG. 20, the image capturing device 1 is connected to a communication network 50, and plural camera-equipped portable terminals $3_1, 3_2, \ldots, 3_M$ are connected directly to the communication network $5_0$ or connected to the communication network $5_0$ via another network, constituting portable-associated transmission lines $5_1, 5_2, \ldots, 5_M$ connected to the image capturing device 1. The image capturing device 1 is connected to the remote image sensing device 2 via the remote transmission line 4. The remote transmission line 5 may be a dedicated line or a line passing through the communication network $5_0$.

Figure 21:
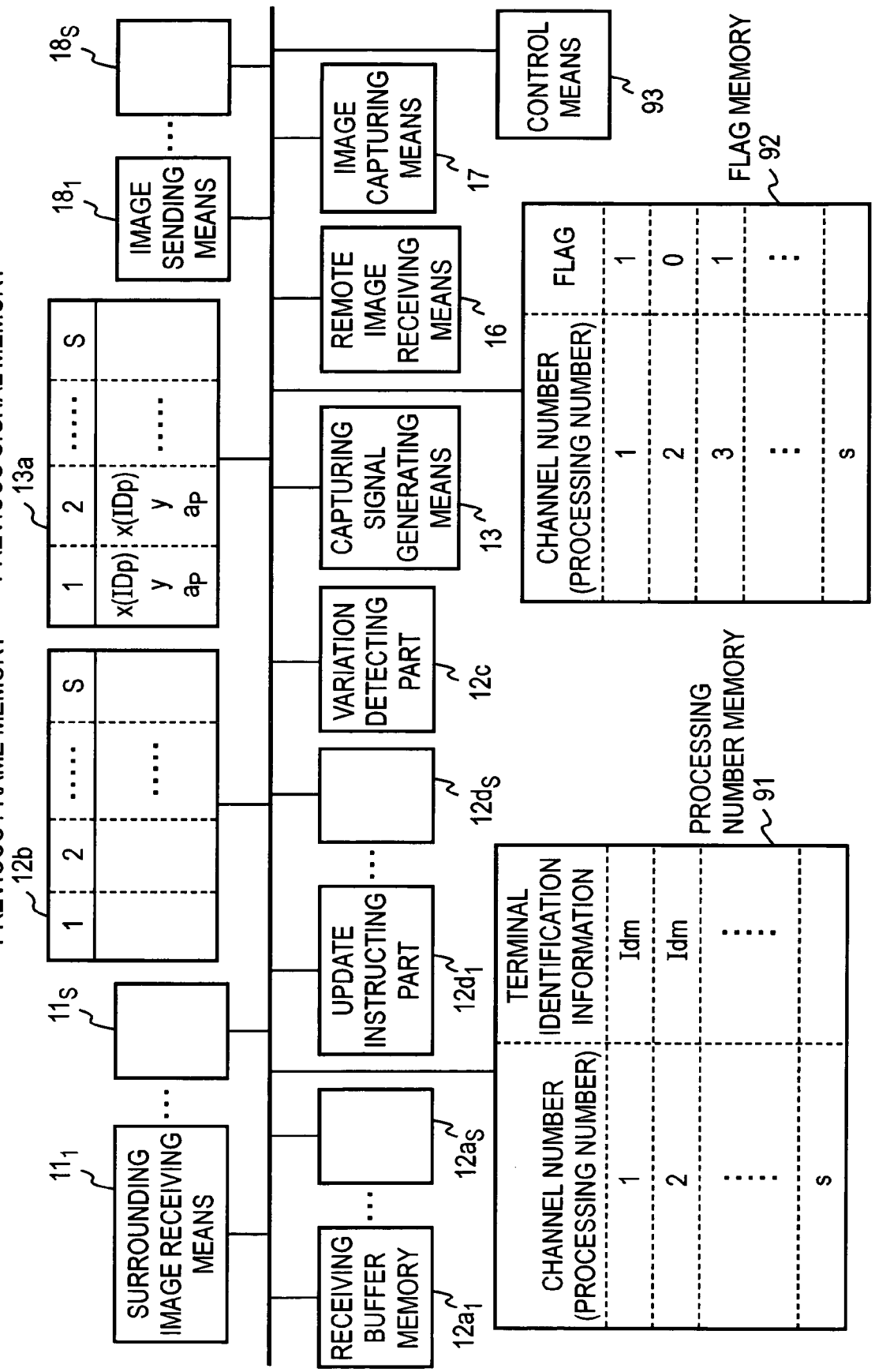
FIG. 21 is a block diagram illustrating an example of he functional configuration of the image capturing device 1 in FIG. 20.

A description will be given first of the case where the remote image sensing device 2 is similar in configuration to that described previously with respect to Embodiment 2. An example of the functional configuration of the image capturing device 1 in this example is shown in FIG. 21. There is provided: a plurality S of lines for connection with a plurality of camera-equipped portable terminals 3, that is, a plurality of surrounding image receiving means $11_1$ to $11_s$; receiving buffer memories $12a_1$ to $12a_s$; a previous frame memory $12b_s$ having S areas for storing surrounding image signals each corresponding to one of line numbers s (s=1, 2, ..., S); a flag memory 92 for storing a flag indicating whether the corresponding camera is being operated, in correspondence to each line number s; an update instructing part $12d_s$ corresponding to each line number s; one or more variation detecting parts 12c (only one of which is shown); one or more capturing signal generating means 13 (only one of which is shown); image sensing means $18_s$ pairing off with the surrounding image receiving means $11_s$ of each line; remote image receiving means 16; one or more image capturing means 17 (only one of which is shown); and control means 93. In the previous signal memory 13a there are provided areas where to store the previous capturing signal (currently used) for each line number s. The control means 93 is provided with a memory having stored therein a program necessary for controlling a microprocessor or CPU (Central Processing Unit) to function as the image capturing device 1, and executes the program to effect a read and a write of each memory and operate the respective parts in a sequential order. The functions of some of the functional blocks in FIG. 21 are performed the control means 93 itself.

A description will be given below of the case where a certain camera-equipped portable terminal 3 uses a line s until completion of reception of a partial-object image signal after connecting to the surrounding image receiving means 11$_s$ of the line number s to make a starting. Upon the starting access being made to the surrounding image receiving means 11$_s$, the capturing signals are read out of that area in the previous signal memory 13a corresponding to the line s, and the read-out capturing signals are used to extract, by the image extracting means 17, a partial-object video signal from a panorama video signal received by the remote image receiving means 17, and the extracted partial-object video signal is sent to the camera-equipped portable terminal 3 by the image sending means 18s of the line number s. In its initial state the previous signal memory 13a has stored in its all areas capturing signal, $x_0$, $y_0$ and $a_{P0}$ in this example, for predetermined partial objects. In the camera-equipped portable terminal 3, upon receiving the video signal from the image capturing device 1, the received video signal is played back and displayed by the image display means 32. The operation for capturing the partial-object video signal in the image capturing means 17 is carried out in the same manner as described previously in respect of Embodiment 2.

Upon receiving a camera operation command by the surrounding image receiving means 11$_s$ of the line s, a flag is set for the line number s in the flag memory 92, that is, the flag is switched from "0" to "1" (the flag being initially set at "0"), then the timer of the update instructing part 12d$_s$ is set, and the surrounding video signal received by the surrounding image receiving means 11$_s$ is stored in the receiving buffer memory 12a$_s$.

Upon each issuance of an update instruction from the update instructing part 12d$_s$, the variation information $d_x$, $d_y$, a is detected by the variation detecting part 12c from the both received surrounding video signals in the receiving buffer memory 12a$_s$ and the previous frame memory 12b, then the capturing signal generating means 13 generates a capturing signal by processing the previous generating signal in the area s of the previous signal memory 13a based on the detected variation information, then the capturing signal in the area s of the previous signal memory 13a is updated with the newly generated capturing signal, and a partial-object video signal by the image capturing means 17 is sent by the image sending means 18, to the camera-equipped portable terminal 3. The video signal in the receiving buffer memory 12a$_s$ is transferred to the area s of the previous frame memory 12b.

Upon receiving a camera operation stop command by the surrounding image receiving means 11$_s$, the flag of the line number s in the flag memory 92 is reset to "0," stopping the operation of the update instructing part 12d$_s$. Based on the capturing signal in the area s of the previous memory 13a, the partial-object video signal is captured, and it is send by the image sending means 18$_s$ on a real time basis. Upon receiving an operation resume command by the surrounding image receiving means 11$_s$, the flag of the line s in the flag memory 92 is set to "1" to put the update instructing part 12d$_s$ in operation, followed by the same processing as in the case of having received the camera operation command. When an end command is received by the surrounding image receiving means 11$_s$, the contents in the previous buffer memory 12a$_s$ the area s of the previous frame memory 12b and the area s of the previous signal memory 13a are erased, and the update instructing part 12d$_s$ is stopped from operation as required, and the flag of the line s in the flag memory 92 is reset to "0."

Figure 17:
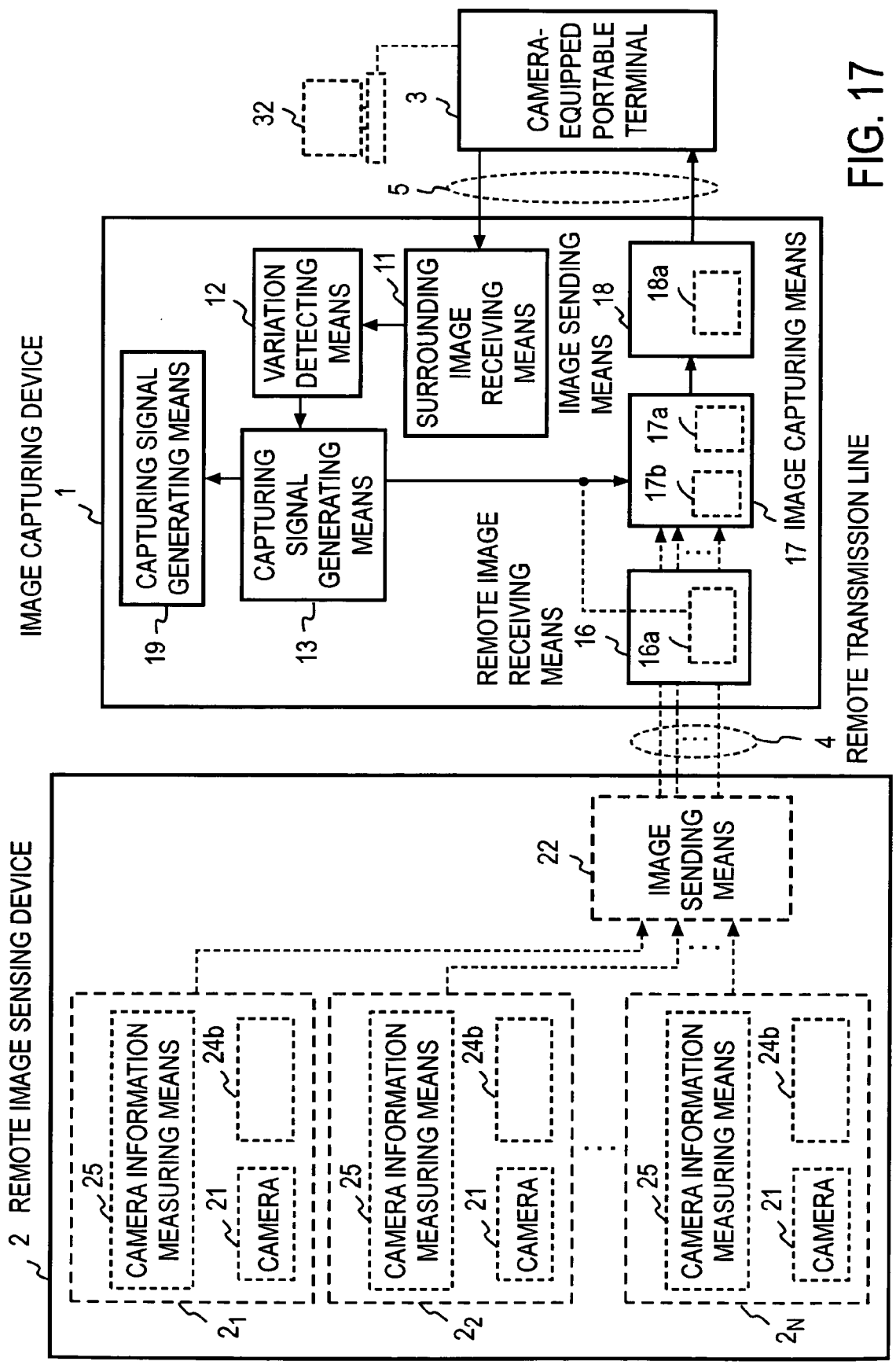
FIG. 17 is a block diagram illustrating an example of the system configuration of Embodiment 4.

For fast processing, provision may also be made to establish connection between the image capturing device 1 and the camera-equipped portable terminal 3 for each signal transmission and reception therebetween until completion of the image capturing operation after sending of the starting access from the camera-equipped portable terminal 3$_m$ (M=1, 2, . . . , M) to the image capturing device 1. In such an instance, the camera-equipped portable terminal 3$_m$ attaches terminal identification information Idm to each signal to be sent. The terminal identification information idm used is, for example, the telephone number or address of the camera-equipped portable terminal 3$_m$ or, if necessary, the equipment number of the camera-equipped portable number 3$_m$, the user's name or so. A processing number memory 91 is provided to define the correspondence between the terminal identification information Idm and the processing number s (s=1, 2, . . . , S) of the circuit number. On receiving the starting access, the terminal identification information Idm and an idle processing number s (the number indicating a line currently not used) are stored in the processing number memory 91 in correspondence to each other. Thereafter, upon each reception of a signal from the camera-equipped portable terminal 3$_m$, the image capturing device 1 uses its terminal identification information Idm to read out the processing number s from the processing number memory 91, and performs processing corresponding to the read-out processing number s. That is, based on the terminal identification information Idm, the flag of the processing number s in the flag memory 91 is controlled, and the operation of the update instructing part 12d$_s$ is controlled; based on the surrounding video signal, the areas s in the receiving buffer memory 12a$_s$ and the previous frame memory 12b are utilized, and the capturing signal in the previous signal memory 13a of the capturing signal generating means 13 and the signal in the memory of the image capturing means 17; and sending of the partial-object video signal is performed by reading out the terminal identification information Idm corresponding to the processing number s in the processing number memory 91 and connecting an idle image sending means 1$^8$, to the camera-equipped portable terminal 3$_m$ of the above-mentioned read-out terminal identification information Idm. As described above, according to Embodiment 6, a plurality of users can see their desired partial-object images via one remote image sensing device 1 by simultaneously operating their camera-equipped portable terminals independently of one another. Incidentally, when processing is congested, pluralities of variation detecting parts 12c, capturing signal generating means 13 and image capturing means 17 are used at the same time.

Where the remote image sensing device 1 used is the same as that shown in FIG. 10, too, a plurality of users can use one remote image sensing device 1 at the same time. That is, in the configuration depicted in FIG. 21 the remote image receiving means 16, the capturing signal generating means 13 and the image capturing means 17 are configured as shown in FIGS. 14 and 17; further, to perform simultaneous processing for the plurality of camera-equipped portable terminals 3$_m$, the image capturing device 1 has, as shown in FIG. 21, the plurality of surrounding image receiving means $11_s$, the plurality of buffer memories $12a_s$, the plurality of update instructing parts $12d_s$, the previous frame memory 12*b* having a plurality of storage areas, the previous signal memory 13*a* having a plurality of storage areas, the plurality of image sending means $18_s$, the flag memory 92, and the control means 93. And, as noted in the parentheses in the previous signal memory 13*a*, the camera identification IDp is used in place of the signal x in the capturing signal, and processing for each camera-equipped portable terminal $3_m$ is performed in the same manner as in the case of using the omnidirectional camera, but the partial-object video signal capturing operation is carried out as described previously with reference to Embodiment 4. In this case, too, it can easily be understood that the plurality of users can see simultaneously on the plurality of camera-equipped portable terminals $3_m$ their desired partial-object images of the video signals in plural directions that are simultaneously received from the plurality of camera devices $2_1$ to $2_N$.

The systems of Embodiments 1 and 3 can also be adapted to simultaneously capture partial-objects images by the plurality of camera-equipped portable terminals $3_m$. In this instance, the image capturing means 17 in FIG. 21 is omitted, and the capturing signal for the camera-equipped portable terminal $3_m$, generated in the image capturing device 1, is attached with, for example, the processing number s for identification use, are sent to the remote image sensing device 2; in the remote image sensing device 1, in the case of the FIG. 4 example, a storage parts 24*a*' for storing capturing signals for respective processing numbers are each provided in the image extracting means 24 as indicated by the broken line in FIG. 20, then the capturing signals in the storage parts 24*a* corresponding to the received processing numbers are updated, then partial-object video signals are extracted based on the capturing signals stored in the respective storage parts 24*a*' as described previously with reference to Embodiment 1, and the extracted partial-object video signals, attached with the processing numbers, are sent to the image capturing device 1. In the image capturing device 1 the partial-object video signals simultaneously received by the camera-equipped portable terminals $3_m$, corresponding to the received processing numbers, are relayed and sent; the image capturing means 17 is omitted.

In the case of the system shown in FIG. 11, as is the case with the above, the storage part 24*a* for storing the capturing signal for each processing number is provided in the image extracting means 24 of the remote image sensing device 2; the capturing signal in the storage part 24*a*,corresponding to the received processing number, is updated with the capturing signal received simultaneously with the processing number, then based on each capturing signals IDp, x, $a_p$ stored in the storage part 24*a*, the partial-object video signal is captured from the corresponding camera device $2_n$, and the captured vide signal is sent to the image capturing device 1, together with the processing number.

MODIFICATIONS

In any of the above-described embodiments, the image display means 32 may be a fixed display for use in a personal computer or the like, as indicated by the broken lines in FIGS. 4, 8, 18 and 20. In any case, however, the display is adapted to play back and display the partial-object video signal sent from the image capturing device 1 to the camera-equipped portable terminal. In this instance, the user operates the camera-equipped portable terminal 3 for camera work while seeing the image displayed on the fixed image display means 32. The camera-equipped portable terminal 3 with the image display means 32 fixed thereto as in the above example is very convenient to use since it is possible for the user to use it anywhere even while walking, for example, to see his child in kindergarten.

The panoramic object 6 needs not always to extend around over 360 degrees, but the object 6 needs only to permit changing the shooting direction or adjustment of the field angle in the case of shooting the object while directly watching it. Further, as referred to previously in respect of Embodiment 3, the panoramic object 6 need not necessarily be continuous. These will readily be understood from the fact that it is sometimes desirable, for example, to shoot only specified parts of a 180-degree scene opening out before the camera or it is used as a security camera for monitoring only several doorways of a building.

In either case, it is possible to turn the shooting direction of the camera-equipped portable terminal 3 from side to side to select the desired partial object, in the above-described example, by using only x or IDp as the capturing signal; further, it is possible to turn the shooting direction of the camera-equipped portable terminal 3 up and down or/and move the camera back and forth to select the desired partial object, in the above-described example, by adding y or/and $a_p$ to the capturing signal. In the above, for each camera operation, the variation information including its amount of operation is detected and the capturing signal to be generated is corrected corresponding to the variation information, but it is also possible to detect a variation in direction alone without detecting the degree (amount) of the variation and add the predetermined value $d_x$ to or subtract it from the previous capturing signal x.

The occasion will sometimes arise where during shooting the surroundings by the camera-equipped portable terminal 3 a flash of powerful light suddenly impinges on the camera 33 by some cause, disturbing the surrounding vide signal. If the capturing signal is generated based on variation information detected from such a disturbed surrounding video signal, then an utterly unexpected partial-object image is received and displayed. To avoid this, it is recommended to provide an erroneous detection preventing part in the variation detecting means 12 of the image capturing device 1 in each embodiment. An example of the erroneous detection preventing part will be described below in connection with Embodiment 1. As indcted by the broken line in FIG. 4, hysteresis information on the variation information sent to the capturing signal generating means 13 is stored in a hysteresis storage part 12*e*. The hysteresis storage part is configured to always store variation information obtained by, for example, three immediately previous detections. For example, when variation information is detected in the detecting part 12*c* in FIG. 5, a decision part 12*f* decides, by comparison, whether the variation information greatly deviates from the continuity of the variation information stored in the hysteresis storage part 12*e*. If it is decided that the current variation information does not greatly deviates from the continuity, that is, if the current information is not abnormal, then the variation information is provided to the capturing signal generating means 13, and at the same time, it is stored as the latest information in the hysteresis storage part 12*e*, removing therefrom the oldest information. If the decision part 12*f* decides that the currently detected variation information is abnormal, then the variation detecting means discards the information in the rejecting part 12*g*, or waits for the next update instruction, or receives the surrounding video signal anew and performs variation detection processing.

When a plurality of users simultaneously use one remote image sensing device 1, provision may be made such that: while watching an image on the display surface 3a of the image display means of a user terminal 3' such as a personal computer, each user operates an operating part 3b by means of key, lever, mouse, or track ball to capture from the panorama video signal a moved or/and zoomed version of a desired partial object in the panoramic object 6 being image sensed by the remote image sensing device 1. The operating part 3b uses, as $d_x$ in the afore-mentioned variation information and the afore-mentioned $d_y$, an x-axis control signal and a y-axis control signal produced by an operation for moving a display on the display screen of a personal computer, for instance, and outputs a control signal for zooming in/out the display on the screen as a in the afore-mentioned variation information, and sends this variation information $d_x$ to the image capturing device 1. In this instance, the image capturing device 1 uses mere signal receiving means 11s as a substitute for the surrounding image receiving means 11s, and the capturing signal generating mean 13 generates the capturing signal using the variation information received by the receiving means 11s from each user terminal 3' and the previous capturing signal x (or IDp), y, $a_p$ in the previous signal memory 13a according to the processing number based on the line number of the signal receiving means 11s or simultaneously received user identification information. The subsequent processing is the same as in Embodiment 6. But the capturing signal is sent to the user terminal 3'.

Where a plural users uses the remote image sensing device 2 in common, the capturing of the partial-object video signal for each user can be carried out by the image capturing device 1 as in Embodiment 1 or 3. In such an instance, the image capturing device 1 generates the capturing signal according to the variation information $d_x$, $d_y$, a received for each user terminal 3' in the same way as described previously, but the capturing signals are IDp, y, a, but as referred to near the end of the description of Embodiment 6, the capturing signal, for example, attached with the processing number, is sent to he remote image sensing device 2, and the remote image sensing device 2 similarly sends the partial-object vide signal corresponding to the capturing signal for each processing number.

While the user terminal 3' has been described as being fixed like a personal computer, it is apparent that it may be a portable telephone, PDA, or similar portable terminal as well. That is, the user terminal is to send to the image capturing device 1 variation information, for example, $d_x$, $d_y$, a, that represent direction and/or zoom with respect to predetermined references so as to specify that partial object in the panoramic object being shot by the remote image sensing device 2.

The image capturing device 1 used in each of Embodiments 1 to 6 can be implemented by a computer. That is, the program for executing the functions of each image capturing device 1 is installed on the computer from a recording medium such as a CD-ROM (Compact Disk Read Only Memory), magnetic disk, and a semiconductor memory, or downloaded to the computer via a communication line for execution by the computer.

What is claimed is:

1. A remote image display method, comprising:
   image sensing a panoramic object by a remote image sensing device;
   sending a video signal of a part of said image-sensed panoramic object via an image capturing device to an image display portion at a place different from said remote image sensing device;
   playing back and displaying said received video signal by said image display portion as an image of a part of said panoramic object;
   image sensing surroundings by a camera-equipped portable terminal at a position where a display on said image display portion can be seen, and sending a surrounding video signal to said image capturing device;
   obtaining variation information about surrounding image by a variation detecting portion in said image capturing devices, based on a previous surrounding video signal and a current surrounding video signal received from said camera-equipped portable terminal;
   obtaining from said remote image sensing device a video signal of a part of said panoramic object changed corresponding to a change of said surrounding image based on said variation information; and
   sending said obtained video signal to said image display portion.

2. An image capturing device comprising:
   a surrounding image receiving portion for receiving a surrounding video signal from a camera-equipped portable terminal;
   a variation detecting portion for detecting, from said received surrounding video signal, variation information of an image of the received surrounding video signal from an image of a previous surrounding video signal having been previously received by said surrounding image receiving portion, the image of the received surrounding video signal hereinafter being referred to as the current image, the image of the previous surrounding video signal hereinafter being referred to as the previous image;
   a capturing signal generating portion for generating a capturing signal from said variation information which is used to obtain a video signal of a part of a panoramic object;
   a signal sending portion for sending said capturing signal to a remote image sensing device that performs image sensing of a panoramic object and outputs a video signal; and
   an image relay portion for receiving said video signal from said remote image sensing device and for sending the received video signal to an image display portion at the same position as said camera-equipped portable terminal.

3. The device of claim 2, wherein:
   said variation detecting portion detects, as said variation information, direction information corresponding to a direction of movement of said current image with respect to said previous image or/and zoom information corresponding to a change in a size of a part of said current image corresponding to a part of said previous image; and
   said capturing signal generating portion generates, as said capturing signal, an extracting reference pixel position signal obtained by correcting a previous extracting reference pixel position signal according to said direction information or/and an image zoom in/out signal corresponding to said zoom information.

4. The device of claim 2, further comprising:
   a camera direction storage portion which stores identification information of each of plural camera devices provided in said remote image sensing device and angularly spaced apart in a shooting direction of the plural camera devices; and wherein:

said variation detecting portion detects, as said variation information, direction information corresponding to a direction of movement of said current image with respect to said previous image; and said capturing signal generating portion determines the shooting direction by referring to the identification information stored in said camera direction storage portion based on a previously generated transmitting camera identification information signal and said direction information, for generating, as said capturing signal, a transmitting camera identification information signal of the camera identification information corresponding to said shooting direction determined by said capturing signal generating portion.

5. The device of claim 2, wherein:

said variation detecting portion detects, as said variation information, direction information corresponding to a direction of movement of said current image with respect to said previous image or/and zoom information corresponding to a change in a size of said current image with respect to said previous image; and said capturing signal generating portion generates, as said capturing signal, a shooting direction change signal corresponding to said direction information or/and zoom change signal corresponding to said zoom information.

6. The device of claim 2, wherein:

said surrounding image receiving portion receives the surrounding video signal from each of a plurality of camera-equipped portable terminals; and said variation detecting portion is provided with a previous frame memory for storing a surrounding video signal used for detecting the previous variation information for each camera-equipped portable terminal, for detecting variation information corresponding to said each camera-equipped portable terminal having transmitted the surrounding video signal, based on the received surrounding video signal and the surrounding video signal stored in said previous frame memory corresponding to said each camera-equipped portable terminal having transmitted the surrounding video signal;

said capturing signal generating portion is provided with a previous signal memory for storing a previously generated capturing signal for said each camera-equipped portable terminal having transmitted the surrounding video signal, for generating a capturing signal corresponding to said each camera-equipped portable terminal from the variation information corresponding to said each camera-equipped portable terminal and said previously generated capturing signal stored in said previous signal memory corresponding to said each camera-equipped portable terminal, and for updating corresponding one of capturing signals in said previous signal memory with said generated capturing signal;

said signal portion sends said generated capturing signal and camera-equipped portable terminal identification information for identifying the camera-equipped portable terminal corresponding thereto; and said image relay portion sends the received video signal to said image display means portion of the camera-equipped portable terminal indicated by the camera-equipped portable terminal identification information received together with said video signal.

7. An image capturing device comprising:

a surrounding image receiving portion for receiving a surrounding video signal from a camera-equipped portable terminal;

a variation detecting portion for detecting, from said received surrounding video signal, variation information of an image of the received surrounding video signal from an image of a previous surrounding video signal having been previously received by said surrounding image receiving means portion, the image of the received surrounding video signal hereinafter being referred to as the current image, the image of the previous surrounding video signal hereinafter being referred to as the previous image;

a capturing signal generating portion for generating, from said variation information and a previously generated capturing signal, a capturing signal that is used to obtain a video signal of a part of a panoramic object;

a remote image receiving portion for receiving a video signal sent from a remote image sensing device having performed image sensing of a panoramic object;

an image capturing portion for capturing the video signal of a part of the panoramic object from said received video signal based on said capturing signal; and an image sending portion for sending said captured video signal to an image display portion at a same position as that of said camera-equipped portable terminal.

8. The device of claim 7, wherein:

the video signal received by said remote image receiving portion is a panorama video signal;

said variation detecting portion detects, as said variation information, direction information corresponding to a direction of movement of said current image with respect to said previous image or/and zoom information corresponding to a change in a size of a part of said current image corresponding to a part of said previous image;

said capturing signal generating portion generates, as said capturing signal, an extracting reference pixel position signal obtained by correcting a previous extracting reference pixel position signal according to said direction information or/and an image zoom in/out signal corresponding to said zoom information; and said image capturing portion captures, from said panorama video signal, one frame of video signal produced by zooming in/out, by said image zoom in/out signal relative to the image of the previously sent captured video signal, a partial image of the panorama image of said panorama video signal that is defined by one frame of video signal or/and the previously generated extracting reference pixel position signal, or said corrected extracting reference pixel position signal with reference to the position on the panorama image that is determined by said corrected extracting reference pixel position signal.

9. The device of claim 7, wherein:

the video signal received by said remote image receiving portion is video signals from a plurality of camera devices of said remote image sensing device with their shooting directions angularly spaced apart; and said image capturing device further comprises:

a camera direction storage portion having stored herein identification information about said plurality of camera devices and information corresponding to the shooting directions; and said variation detecting portion detects, as said variation information, direction information corresponding to a direction of movement of said current image with respect to said previous image;

said capturing signal generating portion determines a shooting direction by referring to the identification information stored in said camera direction storage portion based on a previously generated transmitting camera identification information signal and said direction information, for generating, as said capturing signal, a transmitting camera identification information signal of the camera identification information corresponding to said determined shooting direction; and said image capturing portion captures one of a plurality of video signals corresponding to said generated transmitting camera identification information signal.

10. The device of claim 9, wherein:

said variation detecting portion includes a portion for detecting, as said variation information, second direction information corresponding to the direction of movement of said current image with respect to said previous image in a direction perpendicular to the direction of movement of said detected direction information or/and zoom information corresponding to a change in the size of the part of said current image corresponding to a part of said previous image;

said capturing signal generating portion generates, as said capturing signal, an extracting reference pixel position signal obtained by correcting a previous extracting reference pixel position signal according to said second direction information or/and an image zoom in/out signal corresponding to said zoom information; and said image capturing portion captures, from said captured video signal, one frame of video signal produced by zooming in/out, by said image zoom in/out signal relative to the image of the previously sent captured video signal, a partial image of the image of said captured video signal that is defined by one frame of video signal or/and the previously generated extracting reference pixel position signal, or said corrected extracting reference pixel position signal with reference to the position on the panorama image that is determined by said corrected extracting reference pixel position signal.

11. The device of claim 7, wherein:

said surrounding image receiving portion receives a surrounding video signal from each of a plurality of camera-equipped portable terminals;

said variation detecting portion is provided with a previous frame memory for storing a surrounding video signal used for detecting the previous variation information for said each camera-equipped portable terminal having transmitted the surrounding video signal, for detecting variation information corresponding to said each camera-equipped portable terminal, based on the received surrounding video signal and the surrounding video signal stored in said previous frame memory corresponding to said camera-equipped portable terminal;

said capturing signal generating portion is provided with a previous signal memory for storing a previously generated capturing signal for said each camera-equipped portable terminal having transmitted the surrounding video signal, for generating a capturing signal corresponding to said each detected camera-equipped portable terminal from the detected variation information corresponding to said each camera-equipped portable terminal and said previously generated capturing signal having been stored in said previous signal memory in correspondence to said each camera-equipped portable terminal, and for updating the corresponding to signal in said previous signal memory with said generated capturing signal;

said image capturing portion captures a video signal, for each capturing signal stored in said previous signal memory in correspondence to each camera-equipped portable terminal; and said image sending portion sends said captured video signal for said each camera-equipped portable terminal to an image display portion at a same position as that of said each camera-equipped portable terminal.

12. The device of claim 2 or 7, further comprising:

a variation hysteresis storage portion for storing hysteresis information of said variation information;

a decision portion for deciding whether the variation information detected by said variation detecting portion is abnormal or not by referring to the hysteresis information stored in said variation hysteresis storage portion; and a portion which, when said decision portion decides that said variation information is abnormal, inhibits a supply of said detected variation information to said capturing signal generating portion.

13. A processing method of an image capturing device, comprising:

a first step of deciding whether an operation command for changing the shooting direction of a camera or/and a lens field angle is received or not, the operation hereinafter being referred to as camera operation, the lens field angle being referred to as a zoom amount;

a second step of receiving a surrounding video signal of a surrounding object from a camera-equipped portable terminal when it is decided in said first step that said command is received;

a third step of detecting, from the received surrounding video signal, variation information indicating a variation of an image of the surrounding video signal from an image of the previous surrounding video signal;

a fourth step of generating a capturing signal for capturing a video signal of a part of a panoramic object based on a previous capturing signal and said variation information, the part of a panoramic object hereinafter being referred to as a partial object;

a fifth step of sending said generated capturing signal to a remote image sensing device which performs image sensing of said panoramic object;

a sixth step of receiving a video signal from the remote image sensing device;

a seventh step of sending said received video signal to an image display portion at a same position as that of said camera-equipped portable terminal; and an eighth step of deciding whether a camera operation stop command is received;

wherein when the operation command is not received in said third step, processing proceeds to said sixth step, and when the stop command is not received in said eighth step, processing returns to said first step.

14. A processing method of an image capturing device, comprising:

a first step of deciding whether an operation command for changing the shooting direction of a camera or/and a lens field angle is received or not, the operation hereinafter being referred to as camera operation, the lens field angle being referred to as a zoom amount;

a second step of receiving a surrounding video signal of a surrounding object from a camera-equipped portable terminal when it is decided in said first step that said command is received;

a third step of detecting, from the received surrounding video signal, variation information indicating a variation of an image of the surrounding video signal from an image of the previous surrounding video signal;

a fourth step of generating a capturing signal for capturing a video signal of a part of a panoramic object based on a previous capturing signal and said variation information, the part of a panoramic object hereinafter being referred to as a partial object;

a fifth step of receiving a video signal from a remote image sensing device;

a sixth step of capturing a video signal of a part of a panoramic object from said received video signal based on said generate capturing signal;

a seventh step of sending said captured video signal to an image display means portion at a same position as that of said camera-equipped portable terminal; and an eighth step of deciding whether a camera operation stop command is received;

wherein when the operation command is not received in said first step, processing proceeds to said fifth step, and when the stop command is not received in said eighth step, processing returns to said third step.

15. An image capturing device comprising:

a surrounding image receiving portion for receiving a surrounding video signal from each of a plurality of camera-equipped portable terminals;

a variation detecting portion, provided with a previous frame memory for storing a surrounding video signal, for detecting variation information corresponding to said each camera-equipped portable terminal having transmitted the surrounding video signal, based on the received surrounding video signal and the surrounding video signal stored in said previous frame memory corresponding to said each camera-equipped portable terminal having transmitted the surrounding video signal;

a capturing signal generating portion provided with a previous signal memory for storing a previously generated capturing signal for each piece of user terminal identification information identifying the camera-equipped portable terminal having sent the said variation information signal, for generating, from the detected variation information signal and the previously generated capturing signal of the user terminal identification information stored in the previously memory, a capturing signal to be used for capturing a video signal of a part of a panoramic object, the part of the panoramic object hereinafter being referred to as a partial object;

a signal sending portion for sending said generated capturing signal and the corresponding user terminal identification information to a remote image sensing device which performs image sensing of the panoramic object and outputs its video signal; and an image relay portion for receiving the video signal and the corresponding user terminal identification information from said remote image sensing device and sending the video signal to an image display portion of the camera-equipped portable terminal corresponding to the user terminal identification information.

16. The device of claim 15, wherein:

said variation information signal represents direction information or/and zoom information of the partial object desired to switch from a previous partial object; and said capturing signal generating portion generates, as said capturing signal, an extracting reference pixel position signal obtained by correcting a previous extracting reference pixel position signal according to said direction information or/and an image zoom in/out signal corresponding to said zoom information.

17. The device of claim 15, further comprising:

a camera direction storage portion which stores identification information of each of plural camera devices provided in said remote image sensing device and angularly spaced apart in their shooting direction;

wherein:

said variation information signal represents first direction information of the partial object desired to change from the previous partial object in a first direction, and/or second direction information of the partial object desired to change from the previous partial object in a second direction perpendicular to the first direction information signal and zoom information of the desired partial object; and said capturing signal generating portion determines the shooting direction by referring to the identification information stored in said camera direction storage portion based on a previously generated transmitting camera identification information signal and said first direction information, for generating, as said capturing signal, a transmitting camera identification information signal of the camera identification information corresponding to said determined shooting direction, and/or a reference pixel position signal obtained by correcting said generated reference pixel position corresponding to said second direction information or/and an image zoom in/out signal corresponding to said zoom information.

18. An image capturing device comprising:

a surrounding image receiving portion for receiving a surrounding video signal from each of a plurality of user terminals;

a variation detecting portion, provided with a previous frame memory for storing a surrounding video signal, for detecting variation information corresponding to said each camera-equipped portable terminal having transmitted the surrounding video signal, based on the received surrounding video signal and the surrounding video signal stored in said previous frame memory corresponding to said each camera-equipped portable terminal having transmitted the surrounding video signal;

a capturing signal generating portion provided with a previous signal memory for storing previously generated capturing signals for each piece of user terminal identification information identifying the user terminal having sent the said variation information signal, for generating, from the received variation information signal and the previously generate capturing signal of the user terminal identification information stored in the previously memory, a capturing signal to be used for capturing a video signal of a part of a panoramic object, the part of the panoramic object hereinafter being referred to as a partial object;

a signal sending portion for sending said generated capturing signal to a remote image sensing device which performs image sensing of the panoramic object and outputs its video signal;

a remote image portion for receiving the video signal sent from the remote image sensing device having performed image sensing of a panoramic object;

an image capturing portion for capturing the video signal of a part of the panoramic object from said received video signal based on the capturing signal for each user terminal identification information stored in said previous signal memory; and an image sending portion for sending said captured video signal to the user terminal corresponding to the user terminal identification information.

19. The device of claim 18, wherein:

the video signal received by said remote image receiving portion is a panorama video signal;

said variation information signal represents direction information or/and zoom information for the partial object desired to switch from the previous partial object;

said capturing signal generating portion generates, as said capturing signal, an extracting reference pixel position signal obtained by correcting a previous extracting reference pixel position signal according to said direction information or/and an image zoom in/out signal corresponding to said zoom information; and said image capturing portion captures, from said panorama video signal, one frame of video signal produced by zooming in/out, by said image zoom in/out signal relative to the image of the previously sent captured video signal, a partial image of the panorama image of said panorama video signal that is defined by one frame of video signal or/and the previously generated extracting reference pixel position signal, or said corrected extracting reference pixel position signal with reference to the position on the panorama image that is determined by said corrected extracting reference pixel position signal.

20. The device of claim 18, wherein:

the video signal received by said remote image receiving portion is video signals from a plurality of camera devices of said remote image sensing device with their shooting directions angularly spaced apart; and the device further comprises:

a camera direction storage portion having stored herein identification information about said plurality of camera devices and information corresponding to their shooting directions;

wherein:

said variation information signal represents first direction information of the partial object desired to change from the previous partial object or/and a second direction information of the desired partial object in a direction perpendicular to that of the first direction information or/and zoom information of the desired partial object;

said capturing signal generating portion determines the shooting direction by referring to the identification information stored in said camera direction storage means based on a previously generated transmitting camera identification information signal and said first direction information, for generating, as said capturing signal, a transmitting camera identification information signal of the camera identification information corresponding to said determined shooting direction, and/or a reference pixel position signal obtained by correcting said generated reference pixel position corresponding to said second direction information or/and an image zoom in/out signal corresponding to said zoom information; and said image capturing portion captures that one of a plurality of video signals which corresponds to said generated camera identification signal, and for capturing, from said captured video signal, one frame of video signal produced by zooming in/out, by said image zoom in/out signal relative to the image of the previously sent captured video signal, a partial image of the image of said captured video signal that is defined by one frame of video signal or/and the previously generated extracting reference pixel position signal, or said corrected extracting reference pixel position signal with reference to the position on the panorama image that is determined by said corrected extracting reference pixel position signal.

21. A computer readable recording medium embedded with a program for functioning a computer as said image capturing device described in any one of claims 2, 7, 15 and 18.

* * * * *